US008782235B2

(12) United States Patent
Nishiguchi et al.

(10) Patent No.: US 8,782,235 B2
(45) Date of Patent: Jul. 15, 2014

(54) RESOURCE MIGRATION SYSTEM AND RESOURCE MIGRATION METHOD

(75) Inventors: Naoki Nishiguchi, Kawasaki (JP); Masatomo Yasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1197 days.

(21) Appl. No.: 12/483,366

(22) Filed: Jun. 12, 2009

(65) Prior Publication Data

US 2010/0017515 A1 Jan. 21, 2010

(30) Foreign Application Priority Data

Jul. 18, 2008 (JP) ................................ 2008-187785

(51) Int. Cl.
*G06F 15/173* (2006.01)
*G06F 9/50* (2006.01)
*G06F 9/455* (2006.01)

(52) U.S. Cl.
CPC .... *G06F 9/5077* (2013.01); *G06F 2009/45583* (2013.01); *G06F 9/45558* (2013.01); *G06F 9/5088* (2013.01); *G06F 2009/4557* (2013.01)
USPC .......................................... 709/226; 709/213

(58) Field of Classification Search
USPC ...................... 709/213–216, 226; 718/1, 100
See application file for complete search history.

(56) References Cited

U.S. PATENT DOCUMENTS 7,185,017 B1 * 2/2007 Cauvin et al. ........................ 1/1
7,434,013 B2 * 10/2008 Stevenson et al. ............ 711/162
7,660,867 B2 * 2/2010 Sakuta .......................... 709/215
7,680,919 B2 * 3/2010 Nelson .......................... 709/223
7,761,573 B2 * 7/2010 Travostino et al. ........... 709/226
7,882,326 B2 * 2/2011 Armstrong et al. ........... 711/173
8,239,622 B2 * 8/2012 Hetzler ......................... 711/114
8,260,904 B2 * 9/2012 Nelson .......................... 709/223

(Continued)

FOREIGN PATENT DOCUMENTS

JP 2-257340 10/1990
JP 6-110759 4/1994

(Continued)

OTHER PUBLICATIONS

C. Clark, et al., "Live Migration of Virtual Machines", 2nd USENIX Symposium on Networked Systems Design & Implementation (NSDI '05) pp. 273-286, May 2005.

(Continued)

*Primary Examiner* — Backhean Tiv
(74) *Attorney, Agent, or Firm* — Staas & Halsey LLP

(57) ABSTRACT

A resource migration system includes a plurality of servers. A first (second) server includes a first (second) main memory and a first (second) memory data manager. The first memory data manager manages a set of first data segments formed by copying a plurality of segments of first memory data stored in the first main memory. The second memory data manager receives resource data regarding the first data segments from the first server, determines whether each first data segment is able to be replaced by any of second data segments formed by copying a plurality of segments of second memory data stored in the second main memory, receives from the first server some first data segments which have been determined to be unable to be replaced by any second data segment, and reconstructs the set of first data segments with received first data segments and some second data segments.

18 Claims, 20 Drawing Sheets

(56) References Cited

U.S. PATENT DOCUMENTS

| | | | | |
|---|---|---|---|---|
| 8,458,284 | B2 * | 6/2013 | Huang et al. | 709/213 |
| 2008/0059556 | A1 * | 3/2008 | Greenspan et al. | 709/201 |
| 2009/0089781 | A1 * | 4/2009 | Shingai et al. | 718/1 |
| 2009/0204718 | A1 * | 8/2009 | Lawton et al. | 709/230 |
| 2009/0265706 | A1 * | 10/2009 | Golosovker et al. | 718/1 |
| 2010/0088699 | A1 * | 4/2010 | Sasaki | 718/1 |
| 2010/0318608 | A1 * | 12/2010 | Huang et al. | 709/205 |
| 2011/0219372 | A1 * | 9/2011 | Agrawal et al. | 718/1 |

FOREIGN PATENT DOCUMENTS

| | | |
|---|---|---|
| JP | 9-26911 | 1/1997 |
| JP | 2004-5113 | 1/2004 |
| JP | 2005-100007 | 4/2005 |
| JP | 2007-66265 | 3/2007 |

OTHER PUBLICATIONS

European Search Report dated Nov. 23, 2011 issued in corresponding European Patent Application No. 09163610.0.

Japanese Office Action mailed Feb. 5, 2013 for corresponding Japanese Application No. 2008-187785.

* cited by examiner

T1

| MEMORY ID | HASH VALUE | UPDATE TIME | VM ID | MEMORY ADDRESS | MEMORY SIZE |
|---|---|---|---|---|---|
| 402 | 404 | 406 | 408 | 410 | 412 |

| MEMORY ID | MEMORY ADDRESS | MEMORY SIZE | MEMORY CONTENTS | REFERENCE COUNT |
|---|---|---|---|---|
| 402 | 410 | 412 | 414 | 416 |

| SERVER ID | VM ID |
|---|---|
| 418 | 408 |

| VM ID | MEMORY ID |
|---|---|
| 408 | 402 |

| VM ID | MEMORY ID | UPDATE TIME | HASH VALUE | COPY POINTER |
|---|---|---|---|---|
| 408 | 402 | 406 | 404 | 420 |

| SERVER ID | VM ID | MEMORY ID | UPDATE TIME | HASH VALUE | COPY POINTER |
|---|---|---|---|---|---|
| 418 | 408 | 402 | 406 | 404 | 420 |

FIG. 6B

MIGRATION SOURCE
1
502
506
0000
0001
0010
0011
0100
MIGRATION DESTINATION
2
508
504
SERVER SUPERVISOR
3
ID
DATA SEGMENT
0
1
2
3
4
5
6

CPU
VM CONTROLLER
MEMORY DATA MANAGER
MEMORY DATA DB
SEGMENT DATA DB
UPDATE COUNT DB
PROGRAMS
MAIN MEMORY
COMMUNICATION INTERFACE
INPUT INTERFACE
OUTPUT INTERFACE
SERVER MANAGER
SERVER CONTROLLER
MEMORY DATA EXCHANGER
SERVER MANAGEMENT DB
VM MANAGEMENT DB
MEMORY MANAGEMENT DB

CPU
SERVER MANAGER
SERVER CONTROLLER
MEMORY DATA EXCHANGER
MEMORY DATA MANAGER
MAIN MEMORY
COMMUNICATION INTERFACE
INPUT INTERFACE
OUTPUT INTERFACE
SERVER MANAGEMENT DB
VM MANAGEMENT DB
MEMORY MANAGEMENT DB
PROGRAMS
VM CONTROLLER
MEMORY DATA MANAGER
MEMORY DATA DB
SEGMENT DATA DB
PRIORITY DATA DB
LOAD MEASURER
1
2
3
4
10
11
12
13
14
15
16
17
20
21
22
23
24
25
26
27
30
31
32
33
34
35
36
101
102
120
121
123
130
201
202
220
221
223
230
301
302
303
304
320
321
322
330

CPU
VM CONTROLLER
MEMORY DATA MANAGER
MAIN MEMORY
COMMUNICATION INTERFACE
INPUT INTERFACE
OUTPUT INTERFACE
MEMORY DATA DB
SEGMENT DATA DB
PROGRAMS
SERVER MANAGER
SERVER CONTROLLER
MEMORY DATA EXCHANGER
SERVER MANAGEMENT DB
VM MANAGEMENT DB
MEMORY MANAGEMENT DB
CONVERSION TABLE DB

T7

430 440

| MEMORY INFORMATION OF THE SERVER | | MEMORY INFORMATION OF OTHER SERVERS | | |
|---|---|---|---|---|
| MEMORY ID | UPDATE TIME | SERVER ID | MEMORY ID | UPDATE TIME |
| | | SERVER ID | MEMORY ID | UPDATE TIME |
| | | SERVER ID | MEMORY ID | UPDATE TIME |
| | | SERVER ID | MEMORY ID | UPDATE TIME |
| MEMORY ID | UPDATE TIME | SERVER ID | MEMORY ID | UPDATE TIME |
| | | SERVER ID | MEMORY ID | UPDATE TIME |

RESOURCE MIGRATION SYSTEM AND RESOURCE MIGRATION METHOD

CROSS-REFERENCE TO RELATED APPLICATION

This application is based upon and claims the benefit of priority of the prior Japanese Patent Application No. 2008-187785, filed on Jul. 18, 2008, the entire contents of which are incorporated herein by reference.

FIELD

The embodiments discussed herein are related to a resource migration system in which resources in one information processing apparatus is migrated to another information processing apparatus.

BACKGROUND

Conventionally, the information processing apparatus may run a plurality of virtual machines on a real machine of the information processing apparatus. The information processing apparatus may manage hardware resources and use application software for each virtual machine.

The information processing apparatus may migrate resources of one virtual machine to another virtual machine or another information processing apparatus so as to prevent centralization of load to the one virtual machine (refer to, e.g., Japanese Laid-open Patent Publication No. 2004-5113, Japanese Laid-open Patent Publication No. 9-26911, and C. Clark, et al., "Live Migration of Virtual Machines", 2nd USENIX Symposium on Networked Systems Design & Implementation (NSDI '05), pages 273-286, May 2005). FIG. 24 is a diagram illustrating a conventional migration of resources. In a conventional resource migration method, all memory contents stored in a main memory of an information processing apparatus (referred to as a migration source) 4 is migrated to an information processing apparatus (referred to as a migration destination) 5, thereby reconstructing data regarding management and usage of the main memory of the migration source on the migration destination.

With conventional resource migration methods, migration time for the resources including the main memory becomes longer as amount of memory contents of the migration source becomes larger.

SUMMARY

According to an aspect of the present invention, provided is a resource migration system that includes a plurality of servers communicably connected to each other.

A first server which is one of the plurality of servers includes a first main memory, a first storage, and a first memory data manager. The first main memory stores first memory data which is divided into a plurality of segments each of which has a predefined size. The first storage stores a set of first data segments. Each of the first data segments is formed by copying each of the plurality of segments of the first memory data stored in the first main memory. The first memory data manager manages the first data segments stored in the first storage.

A second server which is another of the plurality of servers includes a second main memory, a second storage, and a second memory data manager. The second main memory stores second memory data which is divided into a plurality of segments each of which has the predefined size. The second storage stores a set of second data segments. Each of the second data segments is formed by copying each of the plurality of segments of the second memory data stored in the second main memory. The second memory data manager manages the second data segments stored in the second storage. The second memory data manager receives resource data regarding the first data segments from the first server, determines whether each of the first data segments is able to be replaced by any of the second data segments, receives from the first server some of the first data segments which have been determined to be unable to be replaced by any of the second data segments, and reconstructs the set of first data segments with received first data segments and some of the second data segments which some of the first data segments have been determined to be able to be replaced by.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a data format of a memory data table included in a memory data DB of a resource migration system according to a first embodiment of the present invention;

FIG. 3 is a diagram illustrating an example of a data format of a data segment included in a data segment DB of a resource migration system according to a first embodiment of the present invention;

FIG. 4 is a diagram illustrating an example of a data format of a server management table included in a server management DB of a resource migration system according to a first embodiment of the present invention;

FIG. 5 is a diagram illustrating an example of a data format of a VM management table included in a VM management DB of a resource migration system according to a first embodiment of the present invention;

FIGS. 6A and 6B are diagrams illustrating examples of data formats of an ID management table included in a memory management DB of a resource migration system according to a first embodiment of the present invention;

FIG. 19 is a diagram illustrating an example of a data format of a conversion table included in a conversion table DB of a resource migration system according to a fourth embodiment of the present invention;

DESCRIPTION OF EMBODIMENTS

First Embodiment

Figure 1:
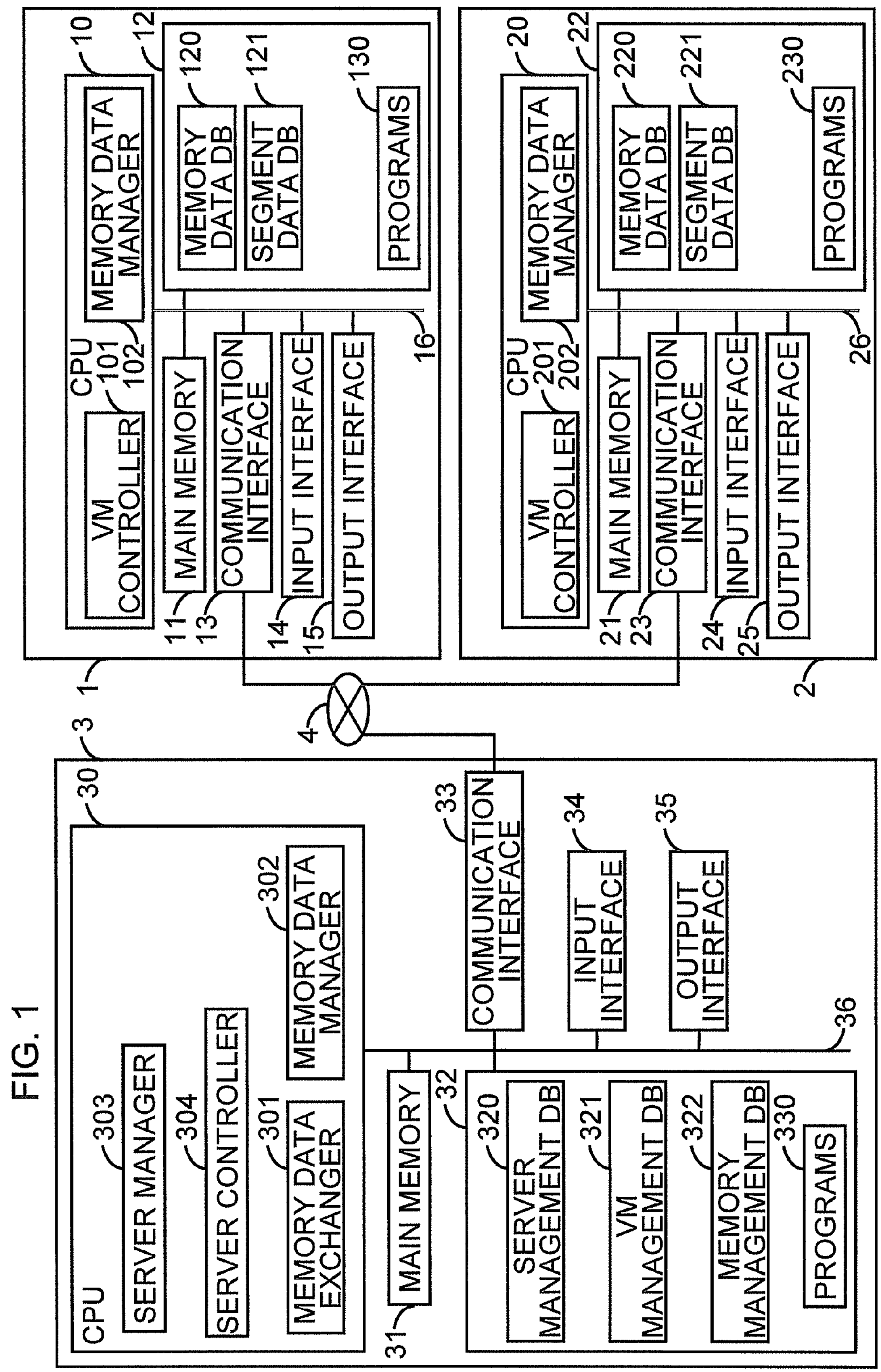
FIG. 1 is a block diagram illustrating a configuration of a resource migration system according to a first embodiment of the present invention.

A discussion will be given on a resource migration system and a resource migration method according to a first embodiment of the present invention with reference to the drawings. FIG. 1 is a block diagram illustrating a configuration of a resource migration system according to a first embodiment of the present invention. Hereinafter, an information processing apparatus is also referred to as a server.

As illustrated in FIG. 1, a resource migration system according to the first embodiment of the present invention includes a server 1 as a migration source, a server 2 as a migration destination, and a server supervisor 3 that manages the server 1 and the server 2. The apparatuses are connected to each other via a communication network 4.

The server 1 as the migration source and the server 2 as the migration destination run a plurality of virtual machines on a real machine of each server and, as discussed later, store data generated by running the virtual machines in a main memory. Under management of the server supervisor 3, the server 1 as the migration source and the server 2 as the migration destination properly consolidate information regarding memory contents of each main memory. The server supervisor 3 selects a server for the server 2 as the migration destination in resource migration, and allows the server 1 as the migration source to migrate resources to the server 2 as the migration destination.

The server 1 as the migration source includes, as a real machine, a CPU 10, a main memory 11, an auxiliary storage 12, a communication interface 13, an input interface 14, and an output interface 15. The devices are mutually connected to each other via a communication line 16.

The main memory 11 stores data generated by performing predefined processes.

The auxiliary storage 12 stores programs 130, a memory data database (DB) 120, and a data segment DB 121. The programs 130 allow the CPU 10 to perform the predefined processes. The memory data DB 120 includes information regarding data (referred to as memory contents) stored in the main memory 11. The data segment DB 121 includes copied data of the memory contents. The memory data DB 120 and the data segment DB 121 may be stored in the main memory 11.

The communication interface 13 is for connection to the communication network 4.

The input interface 14 is for connection to an input device (not shown, similar hereinafter).

The output interface 15 is for connection to an output device (not shown, similar hereinafter).

The programs 130 stored in the auxiliary storage 12 include virtualization software that allows the CPU 10 to perform predefined processes for virtualization. The CPU 10 runs a plurality of virtual machines on the real machine in accordance with the virtualization software. The programs 130 stored in the auxiliary storage 12 also include a plurality of basic software and application software. The CPU 10 executes, for each virtual machine, the basic software so as to manage hardware resources and also uses the application software.

The CPU 10 performs functions of a virtual machine (VM) controller 101 and a memory data manager 102 in accordance with the above-mentioned programs. The CPU 10 controls, as the VM controller 101, start/stop of the virtual machines and the migration of resources (referred to as resource migration). Upon starting a virtual machine, the CPU 10 transmits, to the server supervisor 3, an identifier of the server 1, an identifier of the virtual machine, and a notice of start. Upon stopping the virtual machine, the CPU 10 transmits, to the server supervisor 3, a request (referred to as a deletion request) for deleting information regarding the virtual machine. The control of the resource migration will be discussed later.

The CPU 10 manages, as the memory data manager 102, the space of the main memory 11 by dividing the space into segments of a predefined size, and sequentially storing data generated by running the virtual machines in the divided space. The CPU 10 assigns a memory identifier (ID) to a logical division of the memory contents to identify the logical division. The CPU 10 stores, in the memory data DB 120, the memory ID in association with other data. The CPU 10 also stores, in the data segment DB 121, copied data of the memory contents in association with other data.

The memory data DB 120 includes a plurality of memory data tables Ti. FIG. 2 is a diagram illustrating an example of a data format of a memory data table included in a memory data DB of a resource migration system according to a first embodiment of the present invention. As illustrated in FIG. 2, the memory data table Ti contains a memory ID 402, a hash value 404, an update time 406, a VM ID 408, a memory address 410, and a memory size 412.

The hash value 404 is derived from the memory contents and used for searching and verifying the memory contents.

The update time 406 is the date and time of updating the memory contents.

The VM ID 408 is an identifier of the virtual machine for which the memory contents are generated.

The memory address 410 is an address of the main memory 11 where the memory contents are stored.

The memory size 412 is the predefined size of the segments of the main memory 11.

The data segment DB 121 includes a plurality of segments (hereinafter, referred to as data segments D) of copied data of the memory contents. FIG. 3 is a diagram illustrating an example of a data format of a data segment included in a data segment DB of a resource migration system according to a first embodiment of the present invention. As illustrated in FIG. 3, the data segment D contains the memory ID 402, the memory address 410, the memory size 412, the memory contents 414, and a reference count 416.

The reference count 416 is a counted number of virtual machines that refer to the memory contents 414.

The CPU 10 behaves as the memory data manager 102 each time when memory contents generated by the virtual machine are added or updated. The CPU 10 adds or updates, as the memory data manager 102, the memory data table T1 and the data segment D, and sequentially transmits the memory data table T1 and the data segment D to the server supervisor 3. The server supervisor 3 performs consolidation of information (referred to as memory information) regarding the memory contents, which will be discussed later, and transmits a result (referred to as a consolidation result) of consolidation to the server 1 as the migration source. The CPU 10 receives the consolidation result transmitted from the server supervisor 3, and consolidates memory information in accordance with the received consolidation result.

The server 2 as the migration destination includes, as a real machine, a CPU 20, a main memory 21, an auxiliary storage 22, a communication interface 23, an input interface 24, and an output interface 25. The devices are mutually connected to each other via a communication line 26.

The main memory 21 stores data generated by performing predefined processes.

The auxiliary storage 22 stores programs 230, a memory data DB 220, and a data segment DB 221. The programs 230 allow the CPU 20 to perform the predefined processes. The memory data DB 220 includes information regarding the memory contents of the main memory 21. The data segment DB 221 includes copied data of the memory contents. The memory data DB 220 and the data segment DB 221 may be stored in the main memory 21.

The communication interface 23 is for connection to a communication network 4.

The input interface 24 is for connection to an input device (not shown, similar hereinafter).

The output interface 25 is for connection to an output device (not shown, similar hereinafter).

The programs 230 stored in the auxiliary storage 22 include virtualization software that allows the CPU 20 to perform predefined processes for virtualization. The CPU 20 runs a plurality of virtual machines on the real machine in accordance with the virtualization software. The programs 230 stored in the auxiliary storage 22 also include a plurality of basic software and application software. The CPU 20 executes, for each virtual machine, the basic software so as to manage hardware resources and also uses the application software.

The CPU 20 performs functions of a VM controller 201 and a memory data manager 202 in accordance with the above-mentioned programs. The CPU 20 controls, as the VM controller 201, start/stop of the virtual machines and the migration of resources. Upon starting the virtual machine, the CPU 20 transmits, to the server supervisor 3, an identifier of the server 2, an identifier of the virtual machine, and a notice of start. Upon stopping the virtual machine, the CPU 20 transmits, to the server supervisor 3, a deletion request. The control of the resource migration will be discussed later.

The CPU 20 manages, as the memory data manager 202, the space of the main memory 21 by dividing the space into segments of the predefined size, and sequentially storing data generated by running the virtual machines in the divided space. The CPU 20 assigns a memory ID to a logical division of the memory contents to identify the logical division. The CPU 20 stores, in the memory data DB 220, the memory ID in association with other data. The CPU 20 also stores, in the data segment DB 221, copied data of the memory contents in association with other data.

The memory data DB 220 includes a plurality of memory data tables T1. The data format of the memory data table T1 is similar to that of the memory data table T1 included in the memory data DB 120, and a description thereof is thus omitted here.

The data segment DB 221 includes a plurality of data segments D. The data format of the data segment D is similar to that of the data segment D included in the data segment DB 121, and a description thereof is thus omitted here.

The CPU 20 behaves as the memory data manager 202 each time when memory contents generated by the virtual machine are added or updated. The CPU 20 adds or updates, as the memory data manager 202, the memory data table T1 and the data segment D, and sequentially transmits the memory data table T1 and the data segment D to the server supervisor 3. The server supervisor 3 performs consolidation of memory information, which will be discussed later, and transmits the consolidation result to the server 2 as the migration destination. The CPU 20 receives the consolidation result transmitted from the server supervisor 3, and consolidates memory information in accordance with the received consolidation result.

The server supervisor 3 includes a CPU 30, a main memory 31, an auxiliary storage 32, a communication interface 33, an input interface 34, and an output interface 35. The devices are mutually connected via a communication line 36.

The main memory 31 stores data generated by performing predefined processes.

The auxiliary storage 32 stores programs 330 that allow the CPU 30 to perform predefined processes.

The communication interface 33 is for connection to a communication network 4.

The input interface 34 is for connection to an input device.

The output interface 35 is for connection to an output device.

The auxiliary storage 32 also stores a server management DB 320, a VM management DB 321, and a memory management DB 322.

The server management DB 320 includes data for controlling virtual machines running on each server.

The VM management DB 321 includes data for caring a main memory assigned to each virtual machine.

The memory management DB 322 includes data for maintaining memory contents of a main memory assigned to each virtual machine.

FIG. 4 is a diagram illustrating an example of a data format of a server management table included in a server management DB of a resource migration system according to a first embodiment of the present invention. As illustrated in FIG. 4, the server management DB 320 includes a plurality of server management tables T2 for controlling virtual machines running on each server. The server management table T2 contains a server ID 418 and the VM ID 408.

The server ID 418 is an identifier for identifying a server.

FIG. 5 is a diagram illustrating an example of a data format of a VM management table included in a VM management DB of a resource migration system according to a first embodiment of the present invention. As illustrated in FIG. 5, the VM management table T3 contains the VM ID 408 and the memory ID 402.

The VM management DB 321 also includes one or more memory data tables T1 received from each server. The data format of the memory data table TI is similar to that of the memory data table T1 included in the memory data DB 120 and a description thereof is thus omitted here.

FIGS. 6A and 6B are diagrams illustrating examples of data formats of an ID management table included in a memory management DB of a resource migration system according to a first embodiment of the present invention. As illustrated in FIG. 6A, the ID management table T4 contains the VM ID 408, the memory ID 402, the update time 406, the hash value 404, and a copy pointer 422. The copy pointer 422 is a pointer indicating the data segment included in the memory management DB 322. As illustrated in FIG. 6B, the ID management table T4 may also contain the server ID 418.

The memory management DB 322 includes one or more data segments D received from each server. The data format of the data segment D is similar to that of the data segment D included in the data segment DB 121, and a description thereof is thus omitted here.

The CPU 30 performs functions of a memory data exchanger 301, a memory data manager 302, a server manager 303, and a server controller 304 in accordance with the above-mentioned programs.

The CPU 30 receives, as the memory data exchanger 301, one or more memory data tables T1 and data segments D transmitted from each server and stores the received data in the auxiliary storage 32. The CPU 30 properly reads data from the auxiliary storage 32 and sends the read data to the memory data manager 302. The CPU 30 also transmits, to each server, a consolidation result of the consolidation process, which will be discussed later, performed by the memory data manager 302.

The CPU 30 receives, as the memory data manager 302, one or more memory data tables T1 and data segments D from the memory data exchanger 301. The CPU 30 performs consolidation process to consolidate data in the auxiliary storage 32. A flow of the consolidation process will be discussed later.

The CPU 30 generates, as the server manager 303, a server management table T2 upon receiving a notice of start of a virtual machine. Upon receiving a deletion request, the CPU 30 deletes the server management table T2. The CPU 30 performs a process for determining a server 2 as the migration destination. A flow of the process for determining the migration destination will be discussed later.

The CPU 30 transmits, as the server controller 304, a request for allocating resources, an instruction for starting a virtual machine, an instruction for resource migration, and an instruction for stopping the virtual machine to the server 2 as the migration destination determined by the server manager 303. The CPU 30 also transmits an instruction for resource migration to the server 1 as the migration source.

Figure 7:
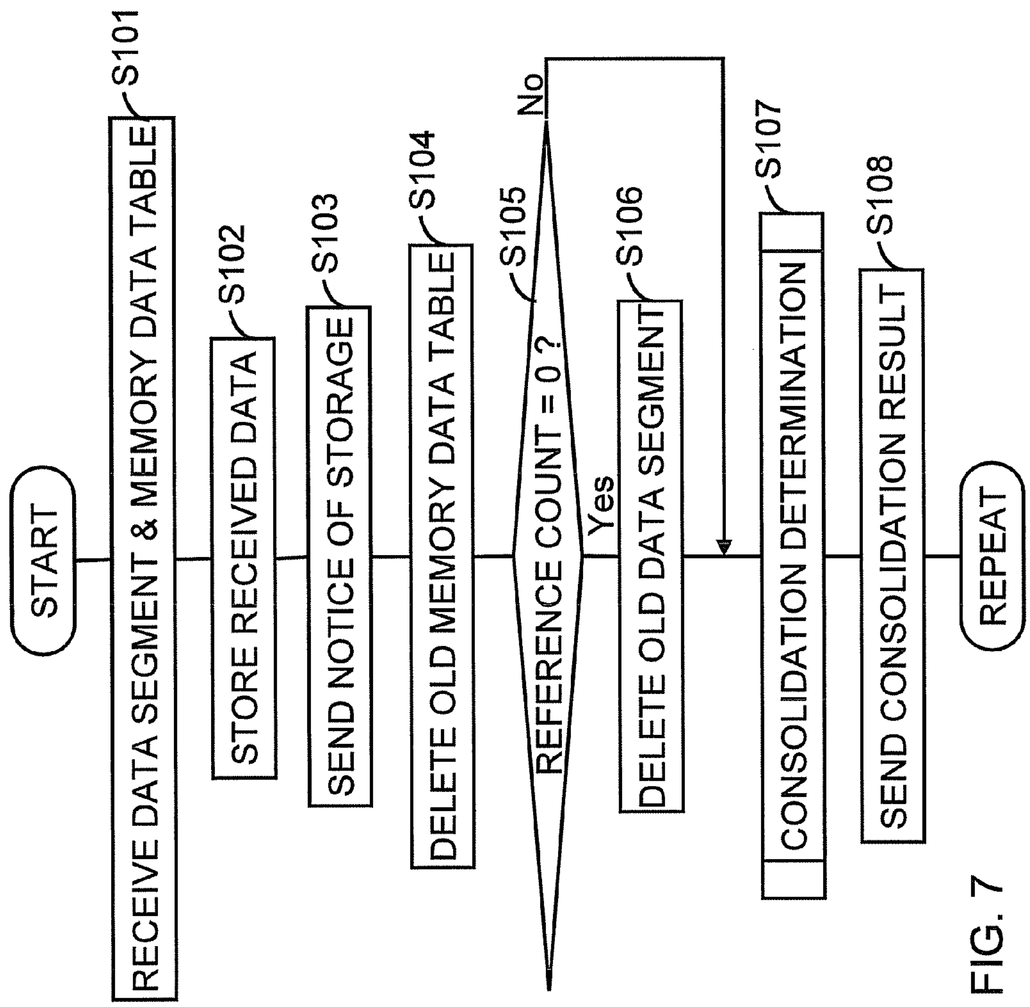
FIG. 7 is a flowchart illustrating a flow of a consolidation process performed by a resource migration system according to a first embodiment of the present invention.

The flow of the consolidation process performed by the CPU 30 will be discussed. FIG. 7 is a flowchart illustrating a flow of a consolidation process performed by a resource migration system according to a first embodiment of the present invention.

In Operation S101, the CPU 30 in the server supervisor 3 receives one or more data segments D and memory data tables T1 transmitted from each server. The following operations are performed for each data segment D and each memory data table T1.

In Operation S102, the CPU 30 stores received data segment D in the memory management DB 322. The CPU 30 also stores received memory data table T1 in the VM management DB 321. If the VM management DB 321 already includes a memory data table T1 containing the same VM ID 408 as the VM ID 408 contained in the received memory data table T1, the existing memory data table TI is to be updated. The CPU 30 generates a VM management table T3 on the basis of the memory ID 402 and the VM ID 408 contained in the received memory data table T1. The CPU 30 generates an ID management table T4 on the basis of the VM ID 408, the memory ID 402, the update time 406, and the hash value 404 contained in the received memory data table T1, as well as a pointer to the data segment D included in the memory management DB 322.

In Operation S103, the CPU 30 transmits, to the server on the transmitting source, a notice (referred to as a notice of storage) indicating the received data has been stored. The server on the transmitting source receives the notice of storage, and performs the next process smoothly, without waiting for the consolidation result transmitted from the server supervisor 3.

In Operation S104, the CPU 30 deletes, from the VM management DB 321, the memory data table T1 before updating.

In Operation S105, the CPU 30 determines whether the data segment D before updating is not referred to by any virtual machine, that is, whether the reference count 416 is 0. When it is determined that the reference count is not 0 ("No" in Operation S105), the data segment D before updating is not deleted and the process proceeds to Operation S107.

In Operation S106, when it is determined that the reference count 416 is 0 ("Yes" in Operation S105), the CPU 30 determines that the data segment D before updating is not referred to by any virtual machine and deletes the data segment D before updating from the memory management DB 322.

In Operation S107, when it is determined that the reference count 416 is not 0 ("No" in Operation S105), or upon deleting the data segment D before updating (Operation S106), the CPU 30 performs a consolidation determination process.

In Operation S108, the CPU 30 transmits a consolidation result to each server. Then, the CPU 30 waits until a request of the next processing is issued.

Figure 8:
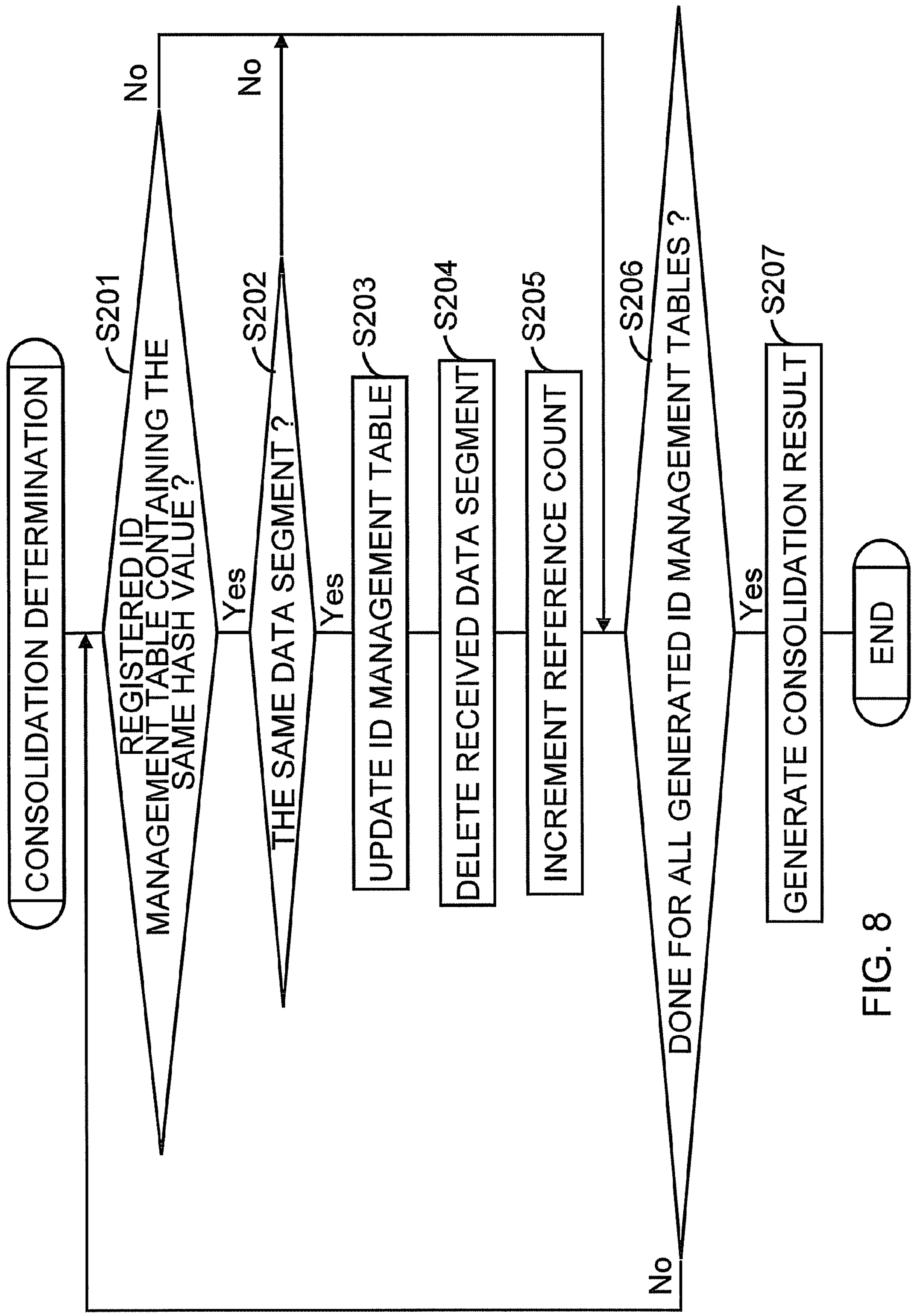
FIG. 8 is a flowchart illustrating a flow of a consolidation determination process performed by a resource migration system according to a first embodiment of the present invention.

A discussion will be given on a flow of the consolidation determination process of Operation S107. FIG. 8 is a flowchart illustrating a flow of a consolidation determination process performed by a resource migration system according to a first embodiment of the present invention.

In Operation S201, the CPU 30 in the server supervisor 3 determines whether the memory management DB 322 includes a registered ID management table T4 containing the same hash value 404 as the hash value 404 in the generated ID management table T4. When it is determined that the memory management DB 322 does not include any registered ID management table T4 containing the same hash value 404 ("No" in Operation S201), the process proceeds to Operation S206.

In Operation S202, when it is determined that the memory management DB 322 includes a registered ID management table T4 containing the same hash value 404 ("Yes" in Operation S201), the CPU 30 determines whether the registered data segment D indicated by the copy pointer 420 contained in the registered ID management table T4 is the same as the received data segment D. When it is determined that the registered data segment D indicated by the copy pointer 420 contained in the registered ID management table T4 is not the same as the received data segment D ("No" in Operation S202), the process proceeds to Operation S206.

In Operation S203, when it is determined that the registered data segment D indicated by the copy pointer 420 contained in the registered ID management table T4 is the same as the received data segment D ("Yes" in Operation S202), the CPU 30 updates the memory ID 402, hash value 404, update time 406, and copy pointer 420 contained in the generated ID management table T4 to corresponding value contained in the registered ID management table T4.

In Operation S204, the CPU 30 preserves the registered data segment D, and deletes the received data segment D from the memory management DB 322.

In Operation S205, the CPU 30 increments the reference count 416 contained in the registered data segment D by one. The process proceeds to Operation S206.

In Operation S206, when it is determined that the memory management DB 322 does not include any registered ID management table T4 containing the same hash value ("No" in Operation S201), when it is determined that the registered data segment D indicated by the copy pointer 420 contained in the registered ID management table T4 is not the same as the received data segment D ("No" in Operation S202), or upon the CPU 30 incrementing the reference count 416 contained in the registered data segment D by one (Operation S205), the CPU 30 determines whether the process has been performed for all the generated ID management tables T4. When it is determined that the process has not yet been performed for all the generated ID management tables T4 ("No" in Operation S206), the process returns to Operation S201 whereupon the process is repeated for a generated ID management table T4 that has not yet been processed.

In Operation S207, when it is determined that the process has been performed for all data in the generated ID management table T4 ("Yes" in Operation S206), the CPU 30 generates the consolidation result. This consolidation result is transmitted to each server in Operation S108. Then, the consolidation determination process ends.

Each of the server 1 as the migration source and the server 2 as the migration destination receives the consolidation result transmitted from the server supervisor 3, and consolidates the memory information in accordance with the consolidation result. In the consolidation of the memory information, the memory ID 402, the hash value 404, and the update time 406 contained in the added or updated memory data table T1 are updated to the contents of the ID management table T4 stored in the server supervisor 3. Each of the server 1 as the migration source and the server 2 as the migration destination transmits updated memory data table T1 to the server supervisor 3.

Upon receiving the memory data table T1 from each server, the CPU 30 in the server supervisor 3 updates the memory data table T1 included in the VM management DB 321 to the received memory data table T1.

As discussed above, in the resource migration system according to the first embodiment of the present invention, the memory information is consolidated commonly on the server 1 as the migration source and on the server 2 as the migration destination. Thus, it may be prevented that the same data segment D is handled as different contents between the servers. This allows the resources to be smoothly migrated between the servers. Further, the resource migration system according to the first embodiment may select the server 2 as the migration destination on the basis of the consolidated information.

Figure 9:
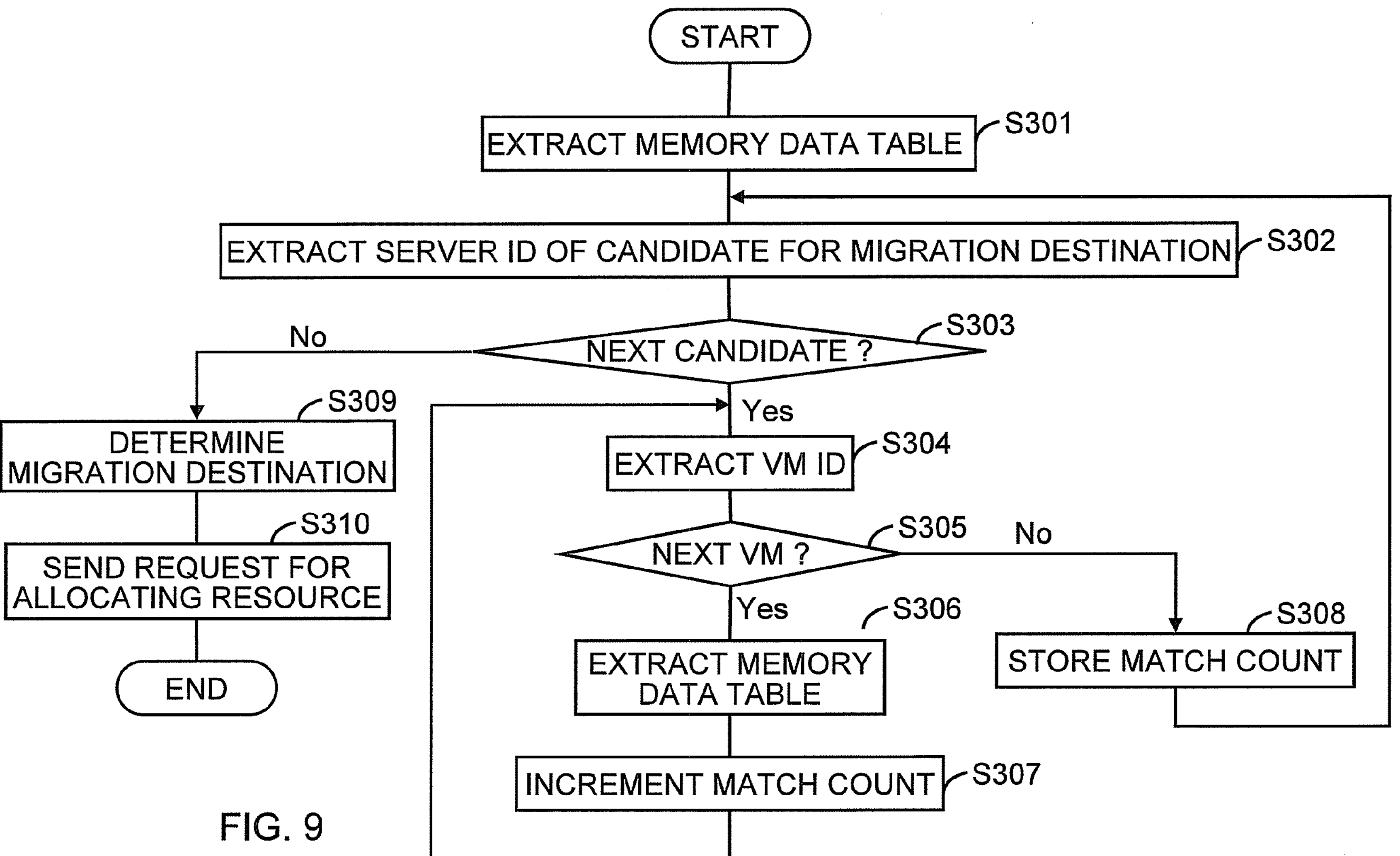
FIG. 9 is a flowchart illustrating a flow of a process for determining a migration destination performed by a resource migration system according to a first embodiment of the present invention.

FIG. 9 is a flowchart illustrating a flow of a process for determining a migration destination performed by a resource migration system according to a first embodiment of the present invention.

In Operation S301, for preparing the resource migration, the server 1 as the migration source transmits, to the server supervisor 3, a VM ID of a virtual machine whose resources are to be migrated. The CPU 30 of the server supervisor 3 extracts a memory data table T1 containing the received VM ID from the VM management DB 321. The extracted memory data table T1 indicates the consolidated state of memory information stored in the server 1 as the migration source.

In Operation S302, the CPU 30 extracts, one by one from server management tables T2, server IDs of candidate servers for a migration destination.

In Operation S303, the CPU 30 determines whether there is a next candidate server for a migration destination. When it is determined that there is no candidate server left for a migration destination ("No" in Operation S303), the process proceeds to Operation S309.

In Operation S304, when it is determined that there is a next candidate server for a migration destination ("Yes" in Operation S303), the CPU 30 extracts, one by one from the server management tables T2, VM IDs of virtual machines on the next candidate server for a migration destination.

In Operation S305, the CPU 30 determines whether there is a next virtual machine. When it is determined that there is no virtual machine left to be processed ("No" in Operation S305), the process proceeds to Operation S308.

In Operation S306, when it is determined that there is a next virtual machine ("Yes" in Operation S305), the CPU 30 extracts a memory data table T1 containing the VM ID from the VM management DB 321.

In Operation S307, the CPU 30 increments a match count for the candidate server by one if the memory data table T1 extracted in Operation S301 matches the memory data table T1 extracted in Operation S306. Herein, two memory data tables T1 may be assumed to match when both the memory ID and the update time are the same between the two memory data tables T1, for example. The process returns to Operation S304 whereupon the CPU 30 repeats the process for the next virtual machine on the candidate server for a migration destination.

In Operation S308, when it is determined that the CPU 30 has performed the process for all the virtual machines on the candidate server for a migration destination and there is no virtual machine left to be processed ("No" in Operation S305), the CPU 30 stores the match count in the main memory 31. The process returns to Operation S302 whereupon the CPU 30 repeats the process for the next candidate server for a migration destination.

In Operation S309, when it is determined that there is no candidate server for a migration destination ("No" in Operation S303), the CPU 30 determines a candidate server having the largest match count stored in the main memory 31 as the migration destination. The CPU 30 extracts a server ID of the determined server from the server management table T2.

In Operation S310, the CPU 30 transmits, to the determined server 2 as the migration destination identified by the extracted server ID, a request for allocating resources for running the virtual machines to be migrated.

Upon receiving the request for allocating resources transmitted from the server supervisor 3, the CPU 20 in the server 2 as the migration destination determines whether the resources for running the virtual machines to be migrated may be allocated. When it is determined that the resources for running the virtual machines may not be allocated, the CPU 20 transmits, to the server supervisor 3, a notice indicating that the resources for running the virtual machines to be migrated may not be allocated. When it is determined that the resources for running the virtual machines to be migrated may be allocated, the CPU 20 transmits, to the server supervisor 3, a notice indicating that the resources for running the virtual machines to be migrated are allocated.

In the resource migration system according to the first embodiment of the present invention, a server having the largest number of data segments D to be migrated is selected as the best migration destination. Thus, the resources in the server 1 as the migration source may be smoothly migrated to the selected server 2 as the migration destination and the data regarding management and usage of the main memory of the migration source may be quickly reconstructed on the migration destination.

Figure 10:
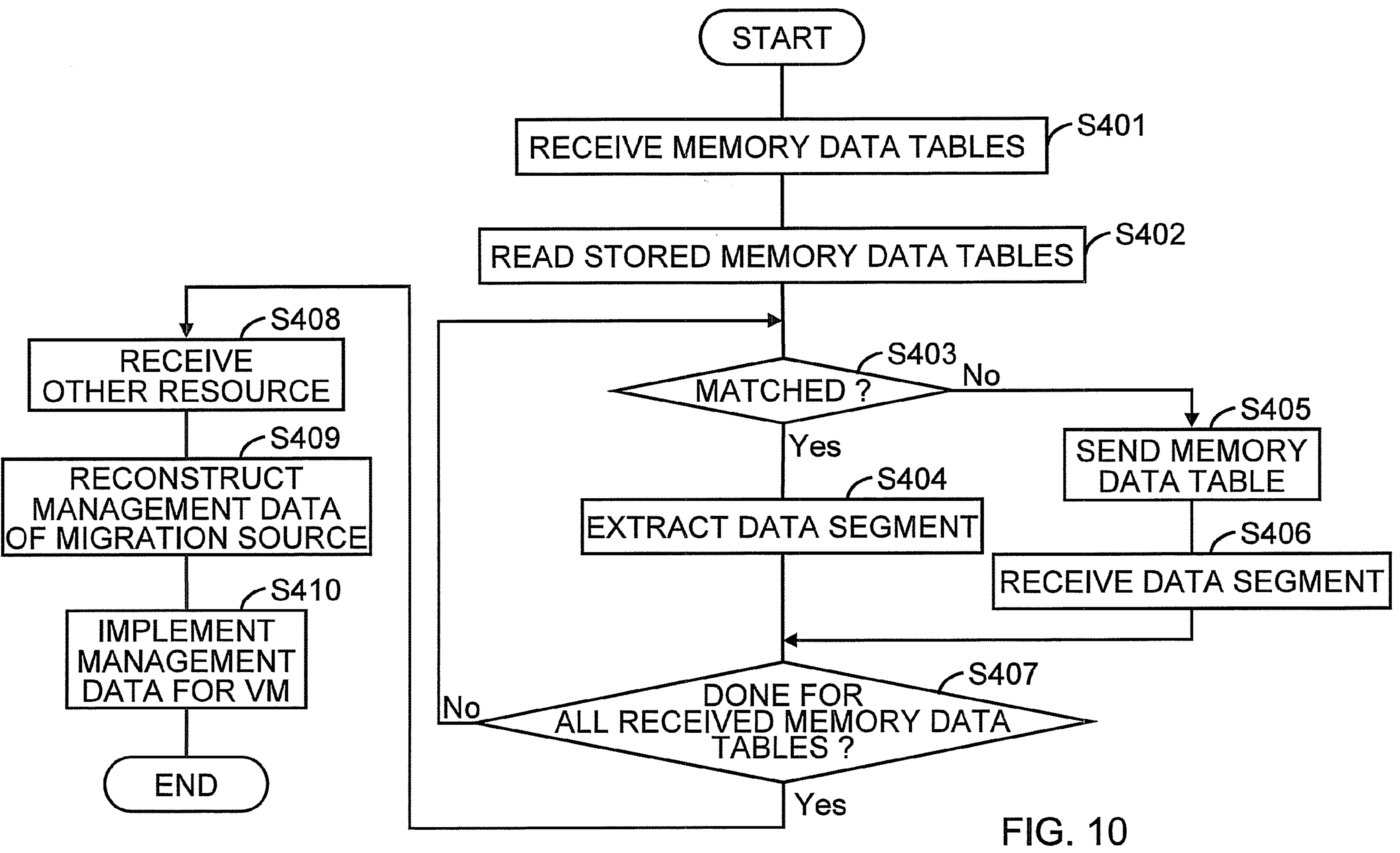
FIG. 10 is a flowchart illustrating a flow of a resource migration process performed by a resource migration system according to a first embodiment of the present invention.

FIG. 10 is a flowchart illustrating a flow of a resource migration process performed by a resource migration system according to a first embodiment of the present invention. The server supervisor 3 transmits, to the server 1 as the migration source, an instruction for resource migration. The instruction for resource migration includes a server ID of the server 2 as the migration destination determined through the process for determining the migration destination. The server 1 as the migration source transmits one or more memory data tables T1 to be migrated to the server 2 as the migration destination, in accordance with the instruction for resource migration received from the server supervisor 3.

In Operation S401, the CPU 20 of the server 2 as the migration destination receives the one or more memory data tables T1 transmitted from the server 1 as the migration source.

In Operation S402, the CPU 20 reads memory data tables T1 included in the memory data DB 220.

In Operation S403, the CPU 20 determines, one by one for the received memory data tables T1, whether there is a memory data table T1 included in the memory data DB 220 of the server 2 that matches the received memory data table T1, that is, whether any of the memory data tables T1 included in the memory data DB 220 may be used in place of the received memory data table T1. Herein, two memory data tables T1 may be assumed to match when both the memory ID and the update time are the same between the two memory data tables T1, for example.

In Operation S404, when it is determined that there is a memory data table T1 included in the memory data DB 220 that matches the received memory data table T1 ("Yes" in Operation S403), the CPU 20 extracts, from the data segment DB 221, a data segment D corresponding to the matched memory data table T1. The process proceeds to Operation S407.

In Operation S405, when it is determined that there is no memory data table T1 included in the memory data DB 220 of the server 2 that matches the one of the received memory data tables T1 ("No" in Operation S403), the CPU 20 transmits the unmatched received memory data table T1 to the server 1 as the migration source. Upon receiving the unmatched received memory data table T1, the CPU 10 of the server 1 as the migration source extracts a corresponding data segment D from the data segment DB 121 of the server 2. The CPU 10 transmits the extracted data segment D to the server 2 as the migration destination.

In Operation S406, the CPU 20 of the server 2 as the migration destination receives the corresponding data segment D. The process proceeds to Operation S407.

In Operation S407, upon extracting the data segment D from the data segment DB 221 of the server 2 (Operation S404), or upon receiving the data segment D transmitted from the server 1 as the migration source (Operation S406), the CPU 20 determines whether the process has been performed for all the memory data tables T1 received from the server 1 as the migration source. When it is determined that the process has not yet been performed for all the memory data tables T1 received from the server 1 ("No" in Operation S407), the process returns to Operation S403 whereupon the CPU 20 repeats the process for the next memory data table T1 received from the server 1 as the migration source.

In Operation S408, when it is determined that the process has been performed for all the memory data tables T1 received from the server 1 ("Yes" in Operation S407), the CPU 20 receives other resources transmitted from the server 1 as the migration source.

In Operation S409, the CPU 20 reconstructs the data regarding management and usage of the main memory of the migration source.

In Operation S410, the CPU 20 implements the reconstructed data regarding management and usage of the main memory for the virtual machine to be newly started. Then, the resource migration process ends.

The resource migration system according to the first embodiment of the present invention tries to reconstruct the data regarding management and usage of the main memory of the migration source with the data segments D stored in the migration destination, and migrates, from the migration source to the migration destination, only the data segments D that are not stored in the migration destination. Thus, the resource migration may be performed more smoothly and quickly as compared with the case in which all the data segments D necessary for reconstructing the data regarding management and usage of the main memory are migrated from the migration source to the migration destination.

Figure 11:
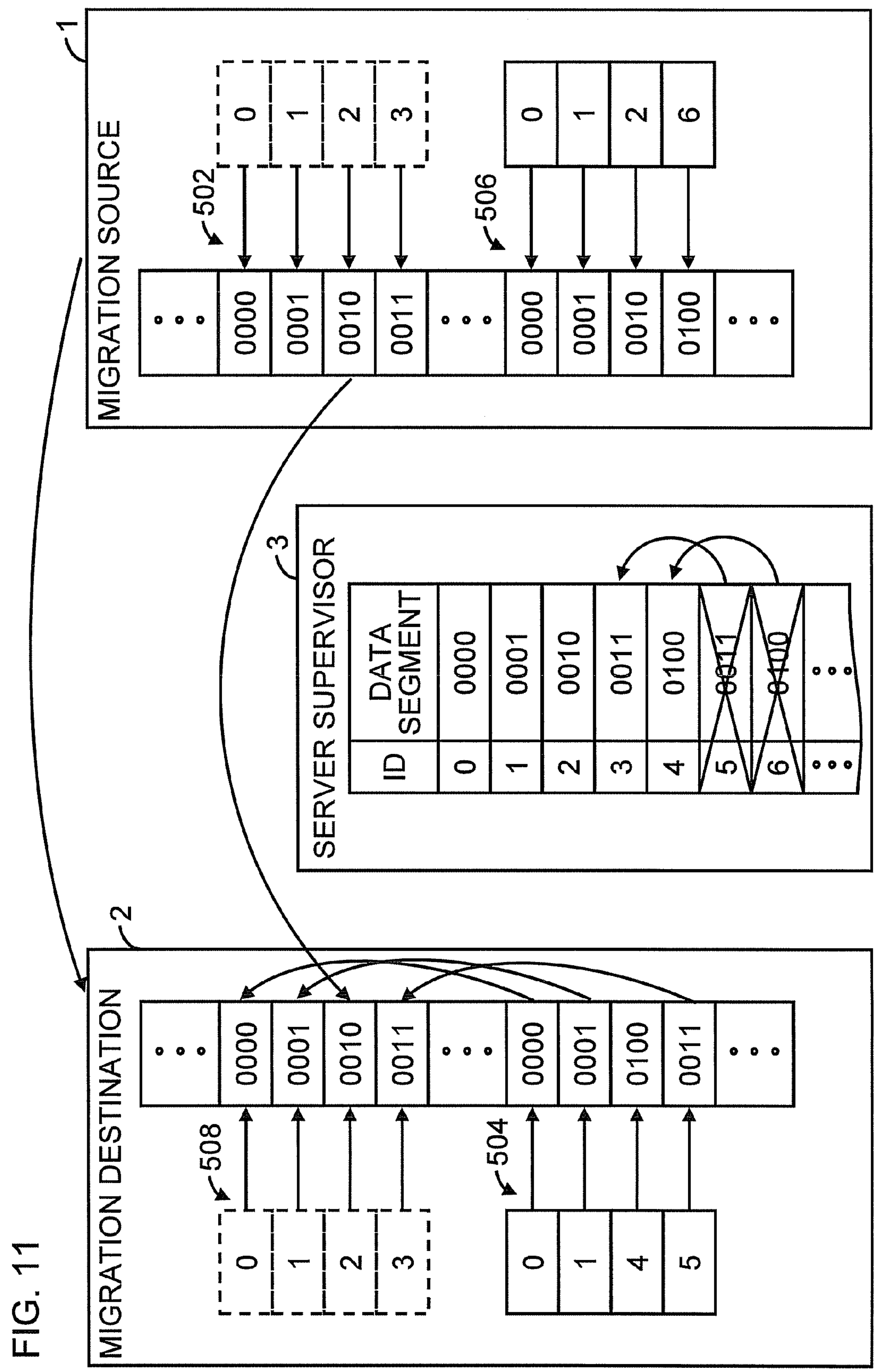
FIG. 11 is a diagram illustrating consolidation and migration of information regarding memory contents performed by a resource migration system according to a first embodiment of the present invention.

An example of a method for consolidation of the memory information and resource migration will be given. FIG. 11 is a diagram illustrating consolidation and migration of information regarding memory contents performed by a resource migration system according to a first embodiment of the present invention. As illustrated in FIG. 11, the server 1 as the migration source stores data 502 of management and usage of the main memory for a first virtual machine, including memory contents "0000", "0001", "0010", and "0011", each assigned with memory ID "0", "1", "2", and "3", respectively.

The server 2 as the migration destination starts a third virtual machine and stores data 504 of management and usage of the main memory for the third virtual machine, including memory contents "0000", "0001", "0100", and "0011", each assigned with memory ID "0", "1", "4", and "5", respectively. The server supervisor 3 consolidates the memory ID of the memory contents "0011" from "5" to "3".

The server 1 as the migration source starts a second virtual machine and stores data 506 of management and usage of the main memory for the second virtual machine, including memory contents "0000", "0001", "0010", and "0100", each assigned with memory ID "0", "1", "2", and "6", respectively. The server supervisor 3 consolidates the memory ID of the memory contents "0100" from "6" to "4".

When the server 2 as the migration destination reconstructs the data 508 of management and usage of the main memory for the first virtual machine, the server 2 does not request the server 1 for memory contents corresponding to the memory ID "0", "1", and "3", which the server 2 already stores. The server 2 requests the server 1 for memory contents corresponding to only the memory ID "2", which the server 2 does not store.

Second Embodiment

According to the first embodiment, when some memory contents are frequently updated, a frequency of connection from each server to the server supervisor 3 increases, and also a frequency of execution of the consolidation process in the server supervisor 3 increases. To cope with this problem, in a resource migration system according to a second embodiment of the present invention, a server supervisor is controlled not to manage frequently updated memory contents.

Figure 12:
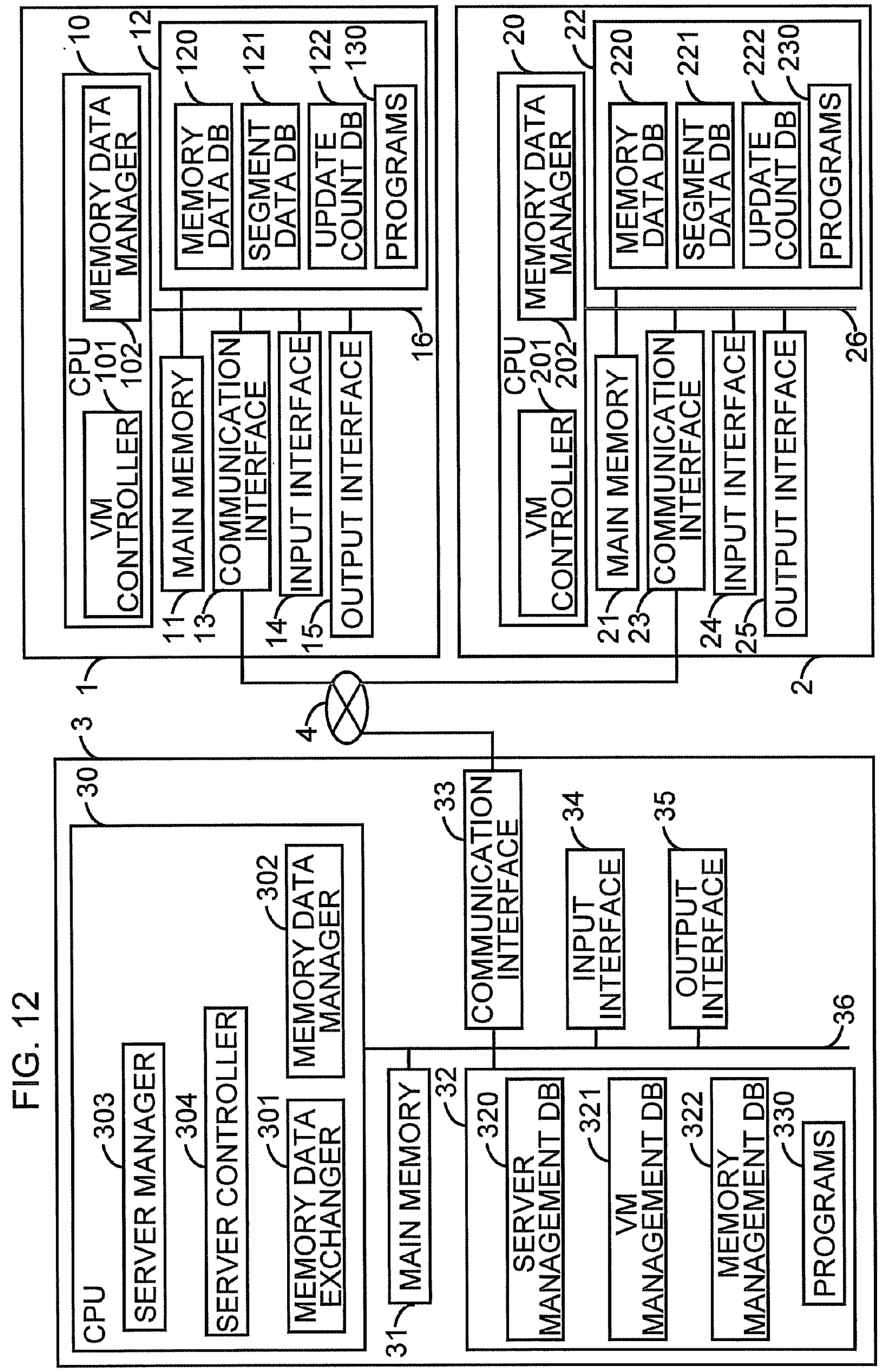
FIG. 12 is a block diagram illustrating a configuration of a resource migration system according to a second embodiment of the present invention.

FIG. 12 is a block diagram illustrating a configuration of a resource migration system according to a second embodiment of the present invention. As illustrated in FIG. 12, a resource migration system according to the second embodiment of the present invention includes a server 1 as the migration source, a server 2 as the migration destination, and a server supervisor 3 that manages the server 1 and the server 2. The apparatuses are connected to each other via a communication network 4.

The configurations and operations of the server 1 as the migration source, the server 2 as the migration destination, and the server supervisor 3, and the flow of the processes are similar to those according to the first embodiment. Like reference numeral denotes like component or like operations, and a description thereof is omitted.

The server 1 as the migration source and the server 2 as the migration destination run a plurality of virtual machines on a real machine of each server and store data generated by running the virtual machines to a main memory. Under management of the server supervisor 3, the server 1 as the migration source and the server 2 as the migration destination properly consolidate information regarding memory contents of each main memory. The server supervisor 3 selects a server for the server 2 as the migration destination in resource migration, and allows the server 1 as the migration source to migrate resources to the server 2 as the migration destination.

Further, the server 1 as the migration source and the server 2 as the migration destination increment an update count each time upon updating the memory contents. When the update count exceeds a predefined threshold, a request for omitting information regarding the frequently updated memory contents from among management targets is requested to the server supervisor 3.

The server 1 as the migration source has a real machine similar to that of the server 1 as the migration source according to the first embodiment. Further, the auxiliary storage 12 of the server 1 as the migration source stores an update count DB 122 that includes information regarding the updating frequency.

Figure 13:
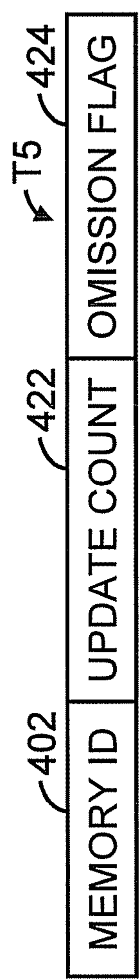
FIG. 13 is a diagram illustrating an example of a data format of an update count table included in an update count DB of a resource migration system according to a second embodiment of the present invention.

The update count DB 122 includes a plurality of update count tables. FIG. 13 is a diagram illustrating an example of a data format of an update count table included in an update count DB of a resource migration system according to a second embodiment of the present invention. The update count table T5 contains the memory ID 402, an update count 422, and an omission flag 424.

The update count 422 is a counted number of updating frequency of the memory contents.

The omission flag 424 is a flag indicative of whether the memory information is to be managed by the server supervisor 3 or not.

The CPU 10 as one of the devices in the real machine performs functions similar to that of the CPU 10 of the server 1 as the migration source according to the first embodiment. Further, the CPU 10 increments, as the memory data manager 102, the update count included in the update count DB 122 each time upon updating the memory contents. When it is determined that the update count exceeds a predefined threshold, the CPU 10 transmits, to the server supervisor 3, a request for omitting corresponding memory information of the server 1 from among management targets.

The server 2 as the migration destination has a real machine similar to that of the server 2 as the migration destination according to the first embodiment. Further, the auxiliary storage 22 of the server 2 as the migration destination stores an update count DB 222 that includes information regarding the updating frequency.

The update count DB 222 includes a plurality of update count tables T5. The data format of the update count table T5 included in the update count DB 222 is similar to that of the update count table T5 included in the update count DB 122, and a description thereof is thus omitted here.

The CPU 20 as one of the devices in the real machine performs functions similar to that of the CPU 20 of the server 2 as the migration destination according to the first embodiment. Further, the CPU 20 increments, as the memory data manager 202, the update count included in the update count DB 222 each time upon updating the memory contents. When it is determined that the update count exceeds a predefined threshold, the CPU 20 transmits, to the server supervisor 3, a request for omitting corresponding memory information of the server 2 from among management targets.

The server supervisor 3 has a real machine similar to that of the server supervisor 3 according to the first embodiment. The CPU 30 as one of the devices in the real machine performs functions similar to that of the CPU 30 of the server supervisor 3 according to the first embodiment. Further, upon receiving omission requests from each server, the CPU 30 deletes the specified memory information of the requesting server.

Figure 14:
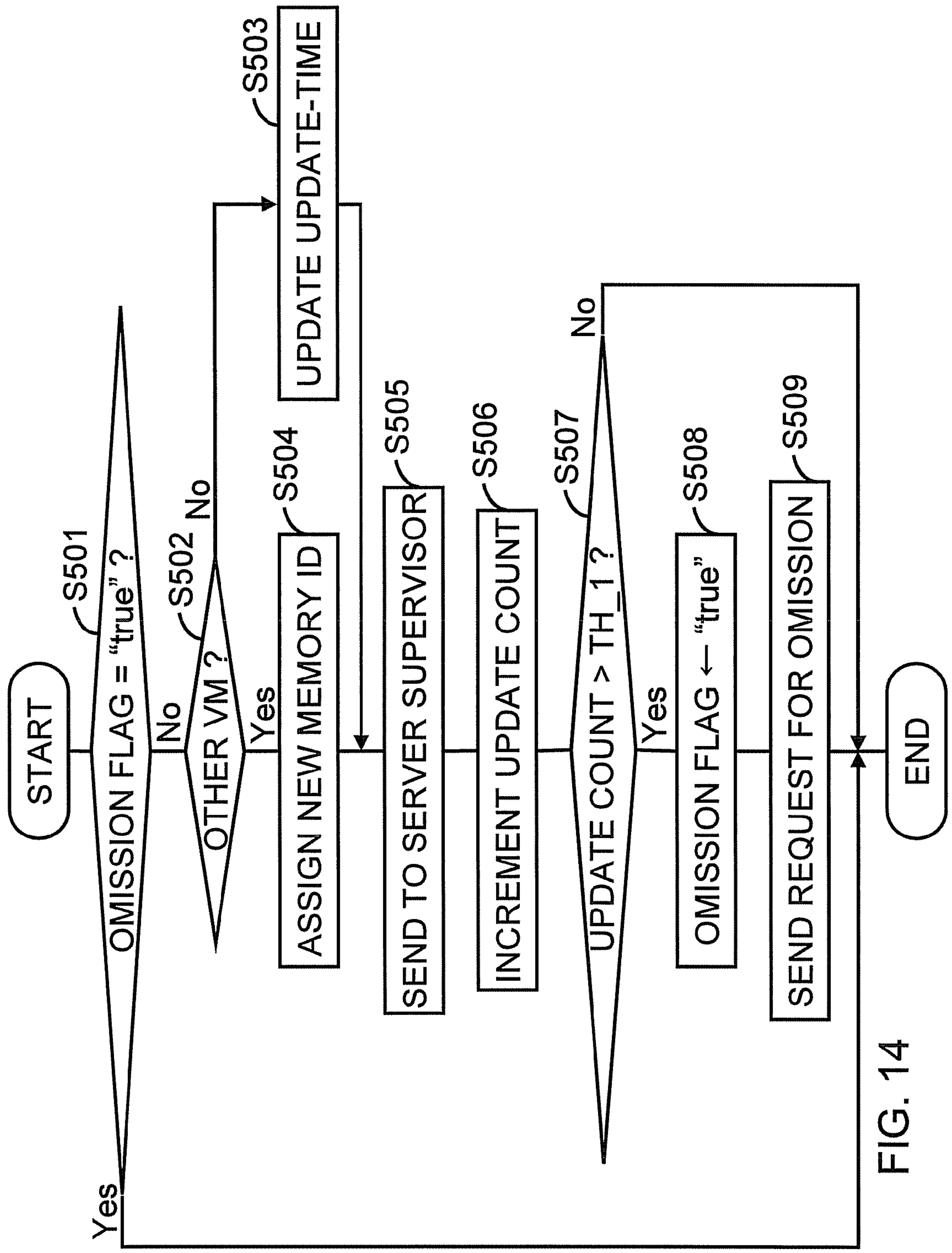
FIG. 14 is a flowchart illustrating a flow of an omission determination process performed by a resource migration system according to a second embodiment of the present invention.

As mentioned above, upon updating the memory contents generated in the virtual machine, the server 1 as the migration source (or the server 2 as the migration destination) performs, before transmitting the memory data table T1 and the data segment D to the server supervisor 3, a process for determining, on the basis of the update count of the memory contents, whether to omit the memory information from among management targets of the server supervisor 3. FIG. 14 is a flowchart illustrating a flow of an omission determination process performed by a resource migration system according to a second embodiment of the present invention. Hereinafter, a discussion will be given on the omission determination process performed by the server 1 as the migration source, for example.

In Operation S501, the CPU 10 of the server 1 as the migration source accesses the update count tables T5 included in the update count DB 122 to determine whether the omission flag 424 corresponding to the memory ID 402 of the updated memory contents is "true". When it is determined that the omission flag 424 is "true" ("Yes" in Operation S501), the CPU 10 determines that the information is already omitted, and then the omission determination process ends.

In Operation S502, when it is determined that the omission flag 424 is not "true" ("No" in Operation S501), the CPU 10 determines whether the memory data table T1 contains a VM ID 408 of another virtual machine corresponding to the memory ID 402 of the updated memory contents.

In Operation S503, when it is determined that the memory data table T1 does not contain a VM ID 408 of another virtual machine ("No" in Operation S502), the CPU 10 updates the update time 406 contained in the updated memory data table T1. Then the process proceeds to Operation S505.

In Operation S504, when it is determined that the memory data table T1 contains a VM ID 408 of another virtual machine ("Yes" in Operation S502), the CPU 10 assigns a new memory ID to the updated memory contents. Then the process proceeds to Operation S505.

In Operation S505, upon updating the update time 406 (Operation S503) or upon assigning the new memory ID (Operation S504), the CPU 10 transmits the updated update time 406 or the newly-assigned memory ID to the server supervisor 3. The CPU 30 of the server supervisor 3 updates the memory data table T1, the data segment D, the VM management table T3, and the ID management table T4 in accordance with the received update time or memory ID.

In Operation S506, the CPU 10 increments the update count 422. Herein, the update count is, for example, a counted number of updating frequency of the memory contents identified by the same memory ID 402.

In Operation S507, the CPU 10 determines whether the incremented update count 422 exceeds a predefined first threshold (denoted by TH_1 in FIG. 14). When it is determined that the incremented update count 422 does not exceed the first threshold ("No" in Operation S507), the omission determination process ends. The CPU 10 transmits the updated memory data table T1 and the updated data segment D to the server supervisor 3.

In Operation S508, when it is determined that the incremented update count 422 exceeds the first threshold ("Yes" in Operation S507), the CPU 10 updates the omission flag 424 contained in the update count table T5 to "true".

In Operation S509, the CPU 10 transmits a deletion request to the server supervisor 3 to delete the memory data table T1, the data segment D, the server management table T2, the VM management table T3, and the ID management table T4. Then, the omission determination process ends. The CPU 10 does not transmit the memory data table T1 and the data segment D to the server supervisor 3.

In the resource migration system according to the second embodiment, the server supervisor 3 does not manage information regarding frequently updated memory contents in any of the servers. Thus, the load on the server supervisor 3 and the increase in information transmitted through the communication network 4 may be suppressed.

Third Embodiment

According to the example of the second embodiment, when the update count of some memory contents exceeds a predefined threshold, the server supervisor 3 may not manage the memory contents. In a resource migration system according to a third embodiment of the present invention, load on each server, a server supervisor, and the communication network is detected, and, in accordance with the detected load, the server supervisor is controlled not to manage information regarding memory contents which caused a large load.

Figure 15:
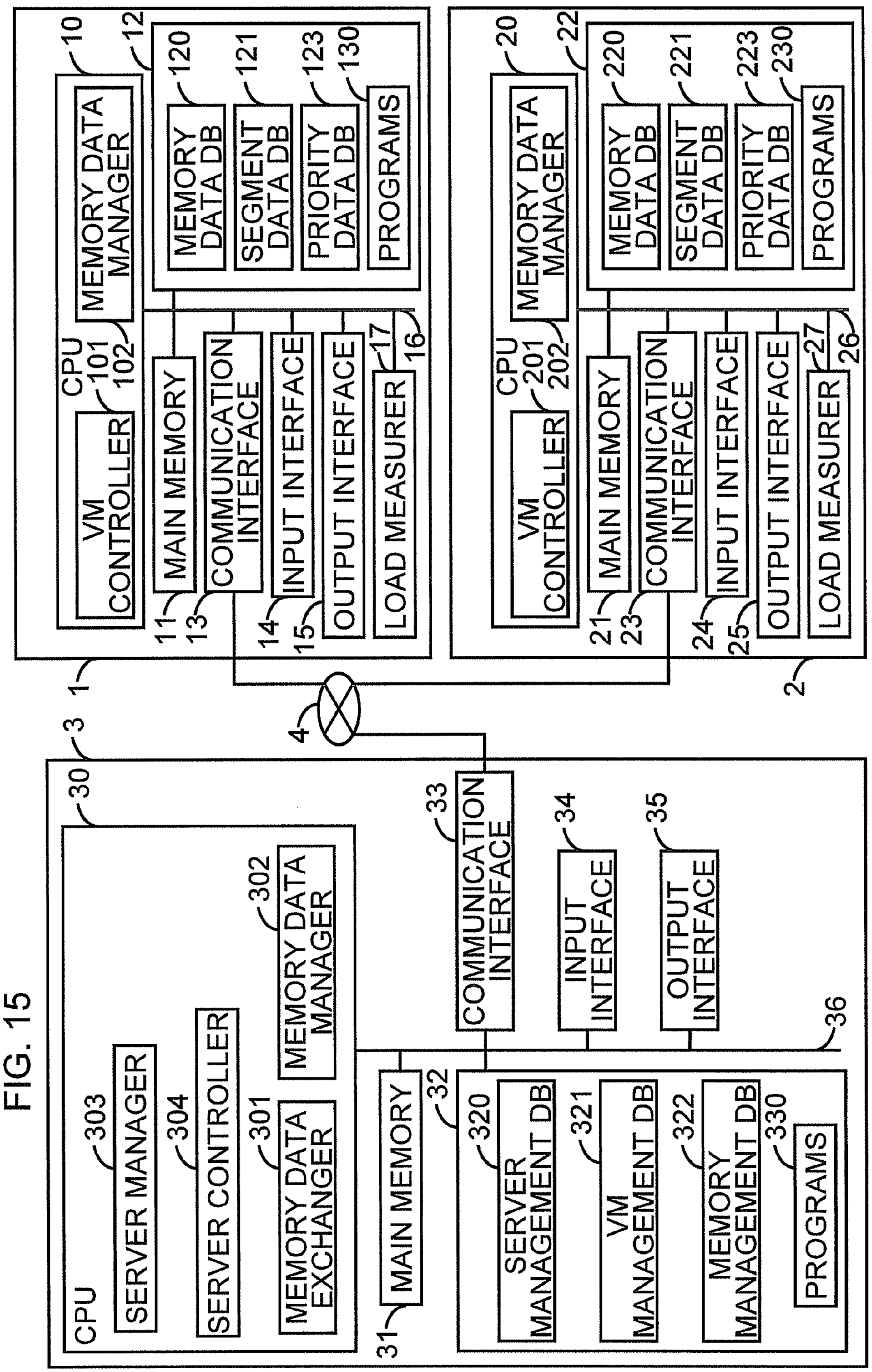
FIG. 15 is a block diagram illustrating a configuration of a resource migration system according to a third embodiment of the present invention.

FIG. 15 is a block diagram illustrating a configuration of a resource migration system according to a third embodiment of the present invention. As illustrated in FIG. 15, a resource migration system according to the third embodiment of the present invention includes a server 1 as the migration source, a server 2 as the migration destination, and a server supervisor 3 that manages the server 1 and the server 2. The apparatuses are connected to each other via a communication network 4.

The configurations and operations of the server 1 as the migration source, the server 2 as the migration destination, and the server supervisor 3, and the flow of the processes are similar to those according to the first embodiment. Like reference numeral denotes like component or like operations, and a description thereof is omitted.

The server 1 as the migration source and the server 2 as the migration destination run a plurality of virtual machines on a real machine of each server and store data generated by running the virtual machines to a main memory. Under management of the server supervisor 3, the server 1 as the migration source and the server 2 as the migration destination properly consolidate information regarding memory contents of each main memory. The server supervisor 3 selects a server for the server 2 as the migration destination in resource migration, and allows the server 1 as the migration source to migrate resources to the server 2 as the migration destination.

Each of the server 1 as the migration source and the server 2 as the migration destination measures load on its own machine and the communication network 4. When the measured load exceeds a predefined threshold, a request for omitting information regarding the memory contents which caused the load from among management targets is requested to the server supervisor 3.

The server 1 as the migration source has a real machine similar to that of the server 1 as the migration source according to the first embodiment. Further, the server 1 as the migration source has a priority data DB 123 stored in the auxiliary storage 12. The priority data DB 123 includes priority data indicating priority of memory information to be omitted from among the management targets of the server supervisor 3. The server 1 also includes a load measurer 17 that measures the load on the server 1 and the communication network 4.

Figure 16:
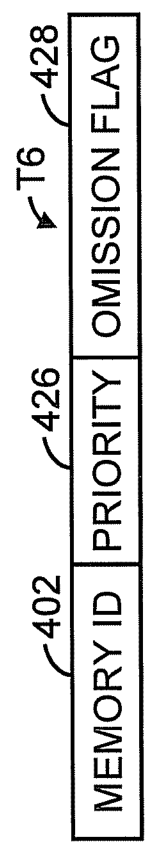
FIG. 16 is a diagram illustrating an example of a data format of a priority data table included in a priority data DB of a resource migration system according to a third embodiment of the present invention.

The priority data DB 123 includes a plurality of priority data tables. FIG. 16 is a diagram illustrating an example of a data format of a priority data table included in a priority data DB of a resource migration system according to a third embodiment of the present invention. The priority data table T6 contains the memory ID 402, a priority 426, and an omission flag 428. A value of the priority 426 is predefined. The omission flag 428 is a flag indicative of whether the memory information is to be managed by the server supervisor 3 or not.

The load measurer 17 measures load on the CPU 10 of the server 1 and the communication interface 13, and determines a second threshold on the basis of a degree of the measured load and a load comparison table (not shown) stored in the auxiliary storage 12. The load comparison table defines a higher second threshold for larger load and a lower second threshold for smaller load. For example, the second threshold is the highest upon the load 100% and the lowest upon the load 0%.

The CPU 10 as one of the devices in the real machine performs functions similar to that of the CPU 10 of the server 1 as the migration source according to the first embodiment. Further, the CPU 10 sets, as the memory data manager 102, the priority 426 contained in the priority data table T6. For example, the CPU 10 accesses the memory data table T1, and counts, for each memory ID, the number of corresponding virtual machines. The CPU 10 sets the priority for each memory ID on the basis of the counted number of the virtual machines and the priority comparison table (not shown) stored in the auxiliary storage 12. The priority comparison table defines higher priority for a memory ID with a greater number of virtual machines and lower priority for a memory ID with a smaller number of virtual machines.

The server 2 as the migration destination has a real machine similar to that of the server 2 as the migration destination according to the first embodiment. Further, the server 2 as the migration destination has a priority data DB 223 stored in the auxiliary storage 22. The priority data DB 223 includes priority data indicating priority of memory information to be omitted from among the management targets of the server supervisor 3. The server 2 also includes a load measurer 27 that measures the load on the server 2 and the communication network 4.

The priority data DB 223 includes a plurality of priority data tables T6. The data format of the priority data table T6 included in the priority data DB 223 is similar to that of the priority data table T6 included in the priority data DB 123, and a description thereof is thus omitted here.

The load measurer 27 measures load on the CPU 20 of the server 2 and the communication interface 23, and determines a second threshold on the basis of a degree of the measured load and a load comparison table (not shown) stored in the auxiliary storage 22. The load comparison table defines a higher second threshold for larger load and a lower second threshold for smaller load. For example, the second threshold is the highest upon the load 100% and the lowest upon the load 0%.

The CPU 20 as one of the devices in the real machine performs functions similar to that of the CPU 20 of the server 2 as the migration destination according to the first embodiment. Further, the CPU 20 sets, as the memory data manager 202, the priority 426 contained in the priority data table T6. For example, the CPU 20 accesses the memory data table T1, and counts, for each memory ID, the number of corresponding virtual machines. The CPU 20 sets the priority for each memory ID on the basis of the counted number of the virtual machines and the priority comparison table (not shown) stored in the auxiliary storage 22. The priority comparison table defines higher priority for a memory ID with a greater number of virtual machines and lower priority for a memory ID with a smaller number of virtual machines.

The server supervisor 3 has a real machine similar to that of the server supervisor 3 according to the first embodiment. The CPU 30 as one of the devices in the real machine performs functions similar to that of the CPU 30 of the server supervisor 3 according to the first embodiment. Further, upon receiving omission requests from each server, the CPU 30 deletes the specified memory information of the requesting server.

Figure 17:
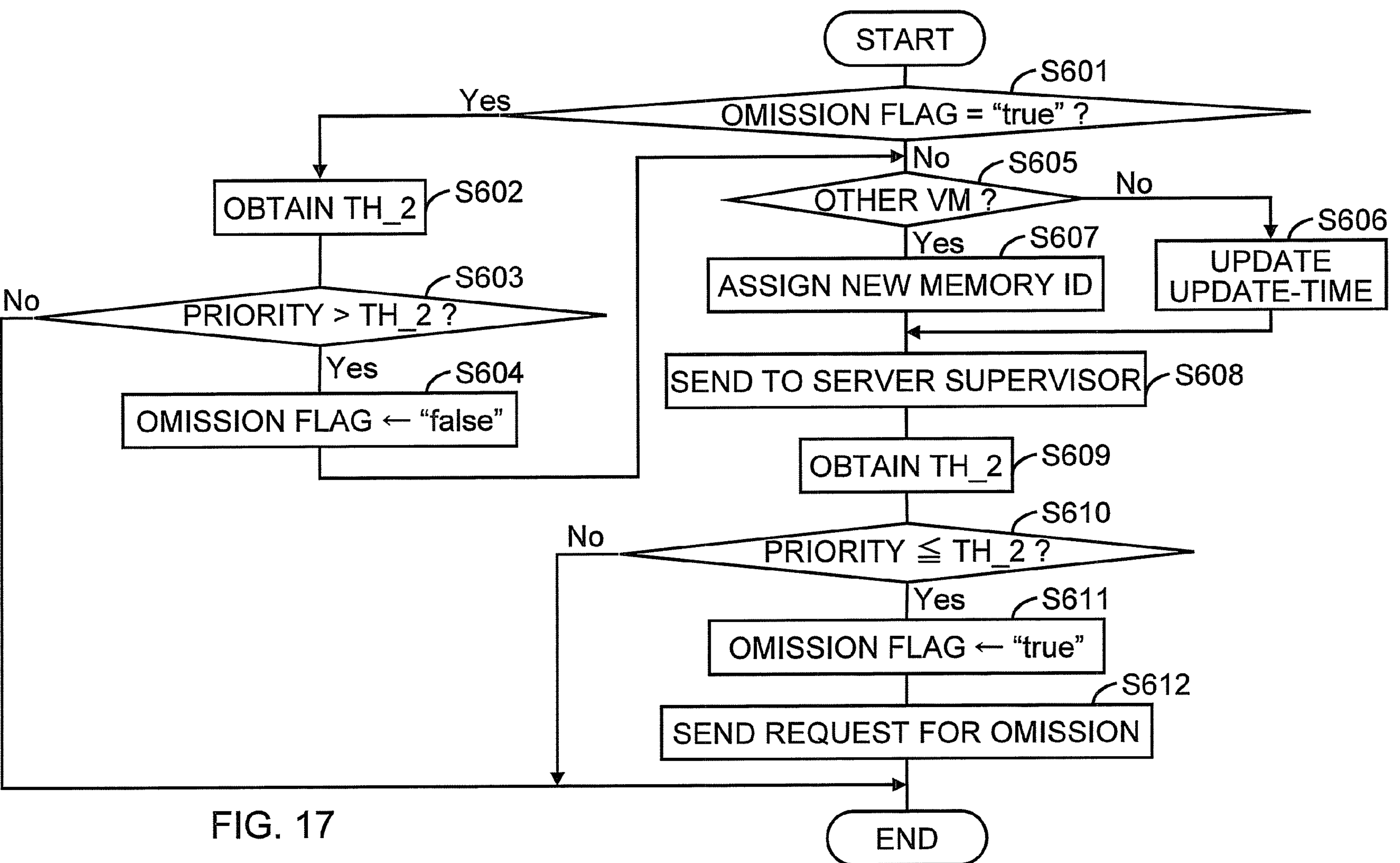
FIG. 17 is a flowchart illustrating a flow of an omission determination process performed by a resource migration system according to a third embodiment of the present invention.

As mentioned above, upon updating the memory contents generated in the virtual machine, the server 1 as the migration source (or the server 2 as the migration destination) measures the load on its own machine and the communication network 4, performs, before transmitting the memory data table T1 and the data segment D to the server supervisor 3, a process for determining, on the basis of the degree of the load, whether to omit the information regarding the memory contents that caused the load from among management targets of the server supervisor 3. FIG. 17 is a flowchart illustrating a flow of an omission determination process performed by a resource migration system according to a third embodiment of the present invention. Hereinafter, a discussion will be given on the omission determination process performed by the server 1 as the migration source, for example.

In Operation S601, the CPU 10 in the server 1 as the migration source accesses the priority data tables T6 included in the priority data DB 123 to determine whether the omission flag 428 corresponding to the memory ID 402 of the updated memory contents is "true". When it is determined that the omission flag 428 is not "true" ("No" in Operation S601), the process proceeds to Operation S605.

In Operation S602, when it is determined that the omission flag 428 is "true" ("Yes" in Operation S601), the CPU 10 obtains the second threshold (denoted by TH_2 in FIG. 17) from the load measurer 17.

In Operation S603, the CPU 10 determines whether the priority 426 corresponding to the "true" omission flag 428 exceeds the second threshold. When it is determined that the priority 426 does not exceed the second threshold ("No" in Operation S603), the CPU 10 determines that the memory information is already omitted, and then the omission determination process ends.

In Operation S604, when it is determined that the priority 426 exceeds the second threshold ("Yes" in Operation S603), the CPU 10 determines that the load on the server 1 and the communication network 4 are reduced and updates the "true" omission flag 428 to "false". Then, the process proceeds to Operation S605.

In Operation S605, upon updating the omission flag 428 to "false" (Operation S604) or when it is determined that the omission flag 428 is not "true" ("No" in Operation S601), the CPU 10 determines whether the memory data table T1 contains a VM ID 408 of another virtual machine corresponding to the memory ID 402 of the updated memory contents.

In Operation S606, when it is determined that the memory data table T1 does not contain a VM ID 408 of another virtual machine ("No" in Operation S605), the CPU 10 updates the update time 406 contained in the updated memory data table T1. Then, the process proceeds to Operation S608.

In Operation S607, when it is determined that the memory data table T1 contains a VM ID 408 of another virtual machine ("Yes" in Operation S605), the CPU 10 assigns a new memory ID to the updated memory contents. Then, the process proceeds to Operation S608.

In Operation S608, upon updating the update time 406 (Operation S606) or upon assigning the new memory ID (Operation S607), the CPU 10 transmits the updated update time 406 or the newly-assigned memory ID to the server supervisor 3. The CPU 30 of the server supervisor 3 updates the memory data table T1, the data segment D, the VM management table T3, and the ID management table T4 in accordance with the received update time or memory ID.

In Operation S609, the CPU 10 obtains the second threshold from the load measurer 17, In Operation S610, the CPU 10 determines whether the priority 426 corresponding to the omission flag 428 determined to be other than "true" in Operation S601 exceeds the second threshold. When it is determined that the priority 426 exceeds the second threshold ("No" in Operation S610), the omission determination process ends. The CPU 10 transmits the updated memory data table T1 and the updated data segment D to the server supervisor 3.

In Operation S611, when it is determined that the priority 426 does not exceed the second threshold ("Yes" in Operation S610), the CPU 10 updates the omission flag 428 determined to be other than "true" in Operation S601 to "true".

In Operation S612, the CPU 10 transmits a deletion request to the server supervisor 3 to delete the memory data table T1, the data segment D, the server management table T2, the VM management table T3, and the ID management table T4. Then, the omission determination process ends. The CPU 10 does not transmit the memory data table T1 and the data segment D to the server supervisor 3.

In the resource migration system according to the third embodiment of the present invention, the server supervisor 3 does not manage information regarding memory contents that apply a large load on any server and the communication network 4. Thus, the load on the servers and the increase in information transmitted through the communication network 4 may be suppressed.

Fourth Embodiment

According to the examples of the first to third embodiments, the server supervisor 3 consolidates the memory information. In a resource migration system according to a fourth embodiment of the present invention, the server supervisor 3 consolidates the memory information and further collects consolidation results to generate conversion tables.

Figure 18:
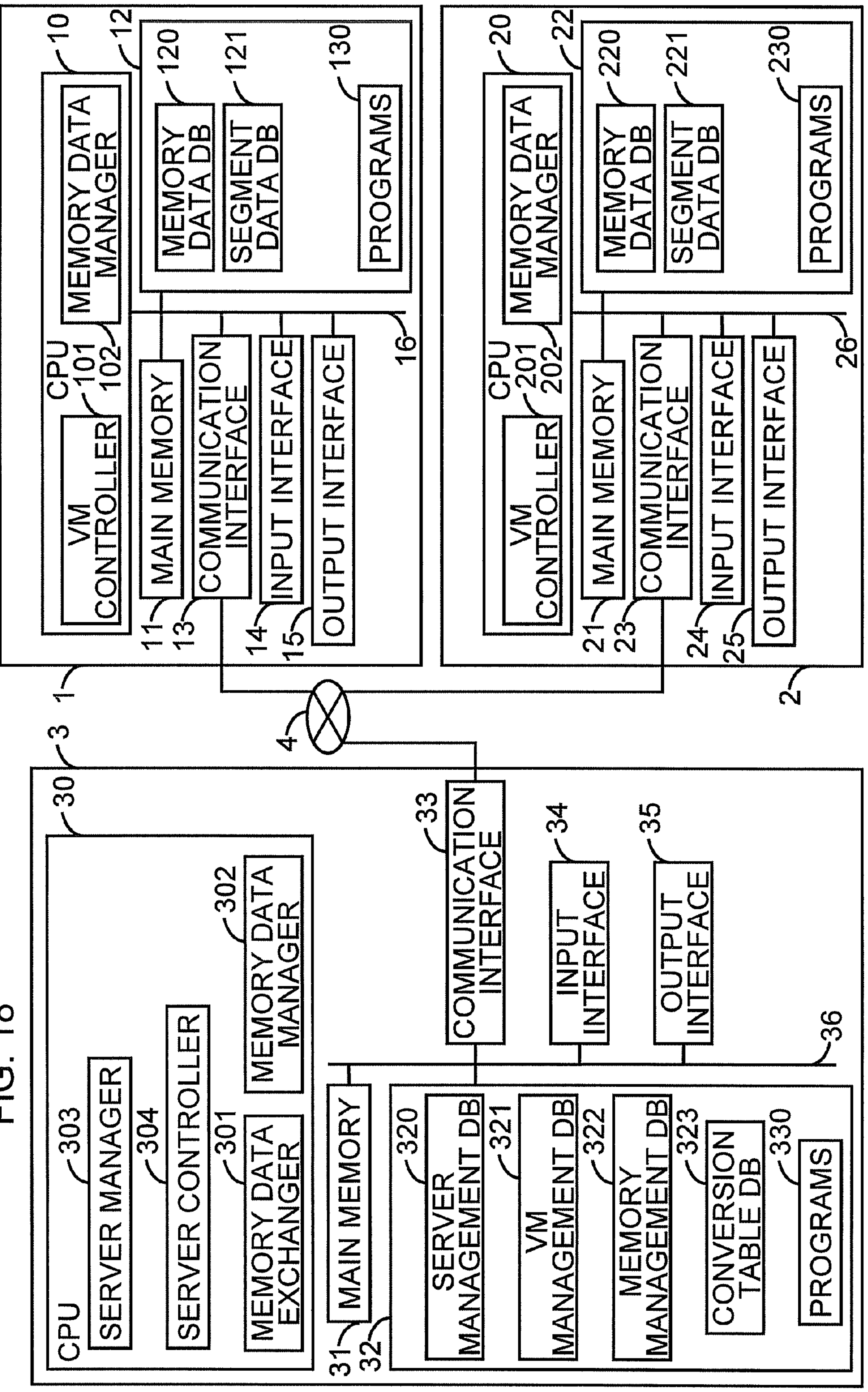
FIG. 18 is a block diagram illustrating a configuration of a resource migration system according to a fourth embodiment of the present invention.

FIG. 18 is a block diagram illustrating a configuration of a resource migration system according to a fourth embodiment of the present invention. As illustrated in FIG. 18, a resource migration system according to the fourth embodiment of the present invention includes a server 1 as the migration source, a server 2 as the migration destination, and a server supervisor 3 that manages the server 1 and the server 2. The apparatuses are connected to each other via a communication network 4.

The configurations and operations of the server 1 as the migration source, the server 2 as the migration destination, and the server supervisor 3, and the flow of the processes are similar to those according to the first embodiment. Like reference numeral denotes like component or like operations, and a description thereof is omitted.

The server 1 as the migration source and the server 2 as the migration destination run a plurality of virtual machines on a real machine of each server, and stores data generated by running the virtual machines to a main memory. The server supervisor 3 consolidates memory information stored in the server 1 as the migration source and the server 2 as the migration destination, thereby collecting consolidation results to generate conversion tables. The server supervisor 3 selects a server for the server 2 as the migration destination in resource migration on the basis of the generated conversion tables. The server 1 as the migration source and the server 2 as the migration destination perform the migration the resources in accordance with the conversion tables generated by the server supervisor 3.

The server 1 as the migration source has a real machine similar to that of the server 1 as the migration source according to the first embodiment. The CPU 10 as one of the devices in the real machine performs functions similar to that of the CPU 10 in the server 1 as the migration source according to the first embodiment.

The server 2 as the migration destination has a real machine similar to that of the server 2 as the migration destination according to the first embodiment. The CPU 20 as one of the devices in the real machine performs functions similar to that of the CPU 20 of the server 2 as the migration destination according to the first embodiment.

The server supervisor 3 has a real machine similar to that of the server supervisor 3 according to the first embodiment. Further, the auxiliary storage 32 of the server supervisor 3 stores a conversion table DB 323 that includes conversion tables.

The conversion table DB 323 includes a plurality of conversion tables FIG. 19 is a diagram illustrating an example of a data format of a conversion table included in a conversion table DB of a resource migration system according to a fourth embodiment of the present invention. The server supervisor 3 generates a conversion table T7 for each server. The conversion table T7 indicates a correspondence between memory information 430 of the server and memory information 440 of other servers. The memory information 430 of the server includes a memory ID 434 and an update time 436. The memory information 440 of other servers includes a server ID 442, a memory ID 444, and an update time 446.

The CPU 30 as one of the devices in the real machine performs functions similar to that of the CPU 30 of the server supervisor 3 according to the first embodiment. Further, the CPU 30 performs, as the memory data manager 302, the consolidation process and collects consolidation results to generate conversion tables T7. The CPU 30 stores the generated conversion tables T7 in the conversion table DB 323.

Figure 20:
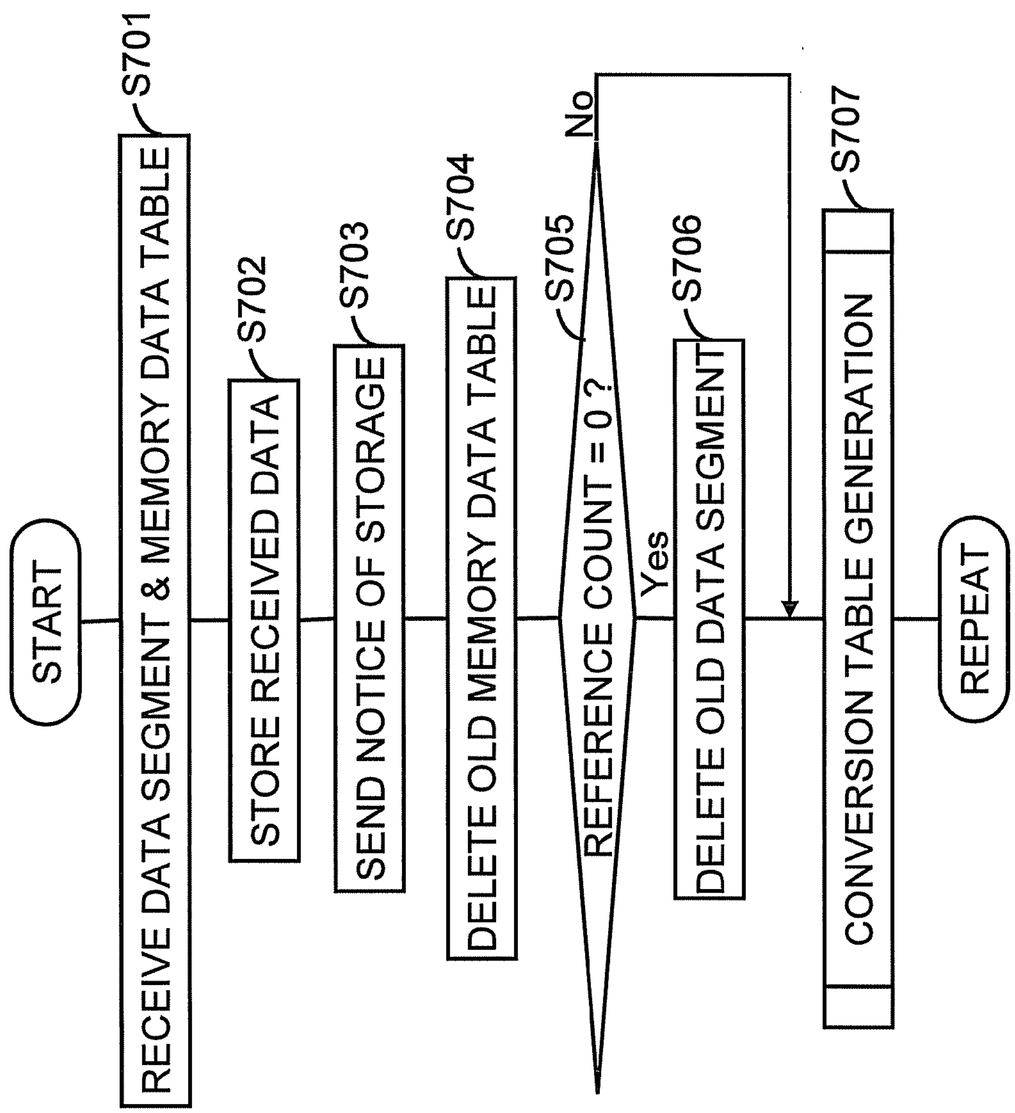
FIG. 20 is a flowchart illustrating a flow of a consolidation process performed by a resource migration system according to a fourth embodiment of the present invention.

The flow of the consolidation process performed by the CPU 30 will be discussed. FIG. 20 is a flowchart illustrating a flow of a consolidation process performed by a resource migration system according to a fourth embodiment of the present invention.

In Operation S701, the CPU 30 in the server supervisor 3 receives one or more data segments D and memory data tables T1 transmitted from each server. The following operations are performed for each data segment D and each memory data table T1.

In Operation S702, the CPU 30 stores received data segment D in the memory management DB 322. The CPU 30 also stores received memory data table T1 in the VM management DB 321. If the VM management DB 321 already includes a memory data table T1 containing the same VM ID 408 as the VM ID 408 contained in the received memory data table T1, the existing memory data table T1 is to be updated. The CPU 30 generates a VM management table T3 on the basis of the memory ID 402 and the VM ID 408 contained in the received memory data table T1. The CPU 30 generates an ID management table T4 on the basis of the VM ID 408, the memory ID 402, the update time 406, and the hash value 404 contained in the received memory data table T1, as well as a pointer to the data segment D included in the memory management DB 322.

In Operation S703, the CPU 30 transmits a notice of storage to the server on the transmitting source. The server on the transmitting source receives the notice of storage, and performs the next process smoothly, without waiting for the consolidation result transmitted from the server supervisor 3.

In Operation S704, the CPU 30 deletes, from the VM management DB 321, the memory data table T1 before updating.

In Operation S705, the CPU 30 determines whether the data segment D before updating is not referred to by any virtual machine, that is, whether the reference count 416 is 0. When it is determined that the reference count is not 0 ("No" in Operation S705), the data segment D before updating is not deleted and the process proceeds to Operation S707.

In Operation S706, when it is determined that the reference count 416 is 0 ("Yes" in Operation S705), the CPU 30 determines that the data segment D before updating is not referred to by any virtual machine and deletes the data segment D before updating from the memory management DB 322.

In Operation S707, when it is determined that the reference count 416 is not 0 ("No" in Operation S705), or upon deleting the data segment D before updating (Operation S706), the CPU 30 performs a conversion table generation process. Then, the CPU 30 waits until a request of the next processing is issued.

Figure 21:
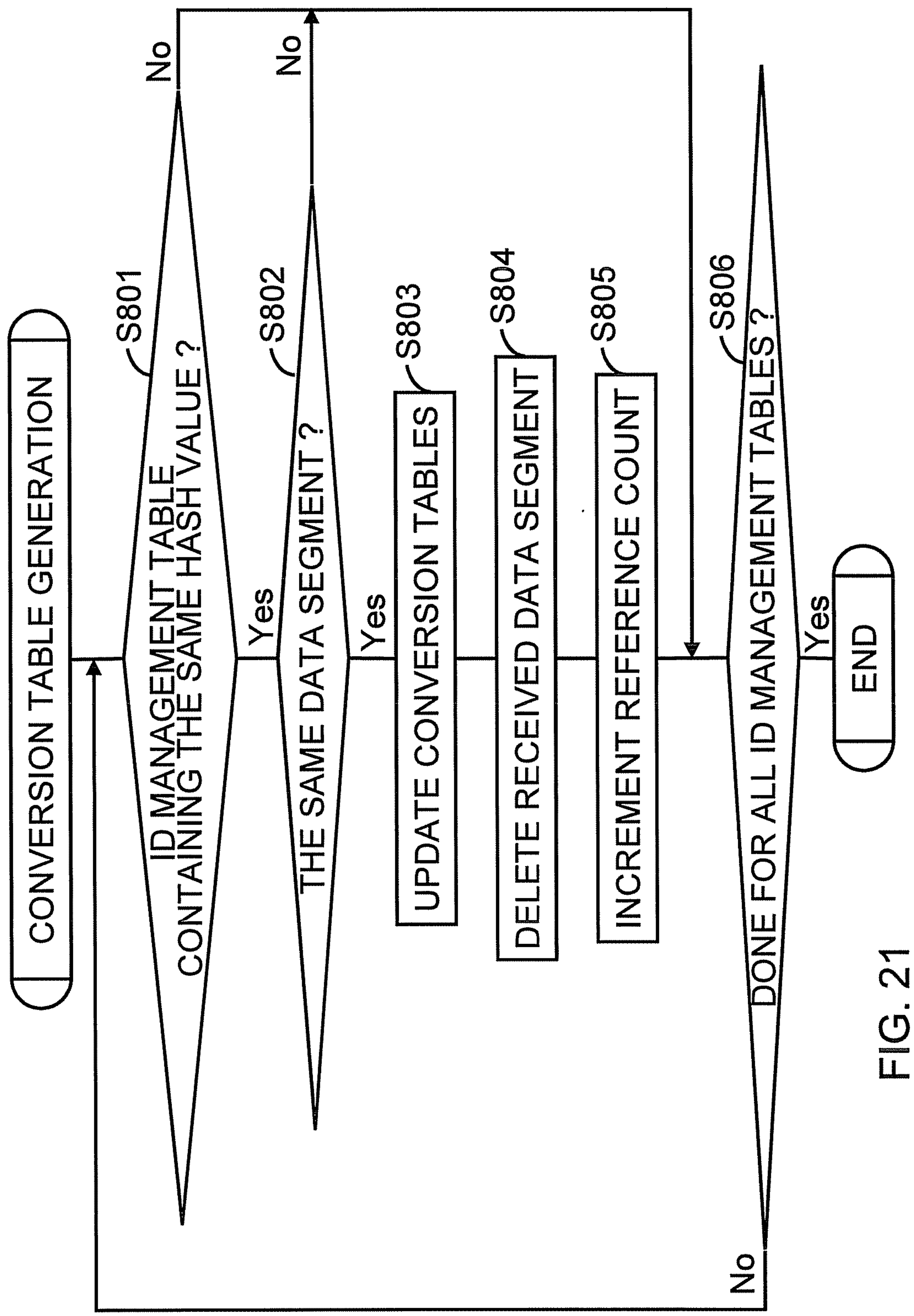
FIG. 21 is a flowchart illustrating a flow of a conversion table generation process performed by a resource migration system according to a fourth embodiment of the present invention.

A discussion will be given on a flow of the conversion table generation process of Operation S707. FIG. 21 is a flowchart illustrating a flow of a conversion table generation process performed by a resource migration system according to a fourth embodiment of the present invention.

In Operation S801, the CPU 30 in the server supervisor 3 determines whether the memory management DB 322 includes a registered ID management table T4 containing the same hash value 404 as the hash value 404 in the generated ID management table T4. When it is determined that the memory management DB 322 does not include any registered ID management table T4 containing the same hash value 404 ("No" in Operation S801), the process proceeds to Operation S806.

In Operation S802, when it is determined that the memory management DB 322 includes a registered ID management table T4 containing the same hash value 404 ("Yes" in Operation S801), the CPU 30 determines whether the registered data segment D indicated by the copy pointer 420 contained in the registered ID management table T4 is the same as the received data segment D. When it is determined that the registered data segment D indicated by the copy pointer 420 contained in the registered ID management table T4 is not the same as the received data segment D ("No" in Operation S802), the process proceeds to Operation S806.

In Operation S803, when it is determined that the registered data segment D indicated by the copy pointer 420 contained in the registered ID management table T4 is the same as the received data segment D ("Yes" in Operation S802), the CPU 30 updates the memory information 430 of the server contained in the conversion table T7 for the server to the memory ID 402 and update time 406 contained in the generated ID management table T4. The CPU 30 also updates the memory information 440 for other servers contained in the conversion tables T7 for other servers to the server ID 418, memory ID 402, and update time 406 contained in the generated ID management table T4.

In Operation S804, the CPU 30 preserves the registered data segment D, and deletes the received data segment D from the memory management DB 322.

In Operation S805, the CPU 30 updates the copy pointer 420 contained in the generated ID management table T4 to share the registered data segment D. The CPU 30 increments the reference count 416 contained in the registered data segment D by one. Then, the process proceeds to Operation S806.

In Operation S806, when it is determined that the memory management DB 322 does not include any registered ID management table T4 containing the same hash value ("No" in Operation S801), when it is determined that the registered data segment D indicated by the copy pointer 420 contained in the registered ID management table T4 is not the same as the received data segment D ("No" in Operation S802), or upon the CPU 30 incrementing the reference count 416 contained in the registered data segment D by one (Operation S805), the CPU 30 determines whether the process has been performed for all the generated ID management tables T4. When it is determined that the process has not yet been performed for all the generated ID management tables T4 ("No" in Operation S806), the process returns to Operation S801 whereupon the process is repeated for a generated ID management table T4 that has not yet been processed.

When it is determined that the process has been performed for all data in the generated ID management table T4 ("Yes" in Operation S806), the conversion table generation process ends.

In the resource migration system according to the fourth embodiment of the present invention, the memory information is consolidated commonly on the server 1 as the migration source and on the server 2 as the migration destination, and consolidation results are collected to generate conversion tables T7. Thus, it may be prevented that the same data segment D is handled as different contents between the servers. Further, the resource migration system according to the fourth embodiment may select the server 2 as the migration destination on the basis of the conversion tables T7.

Figure 22:
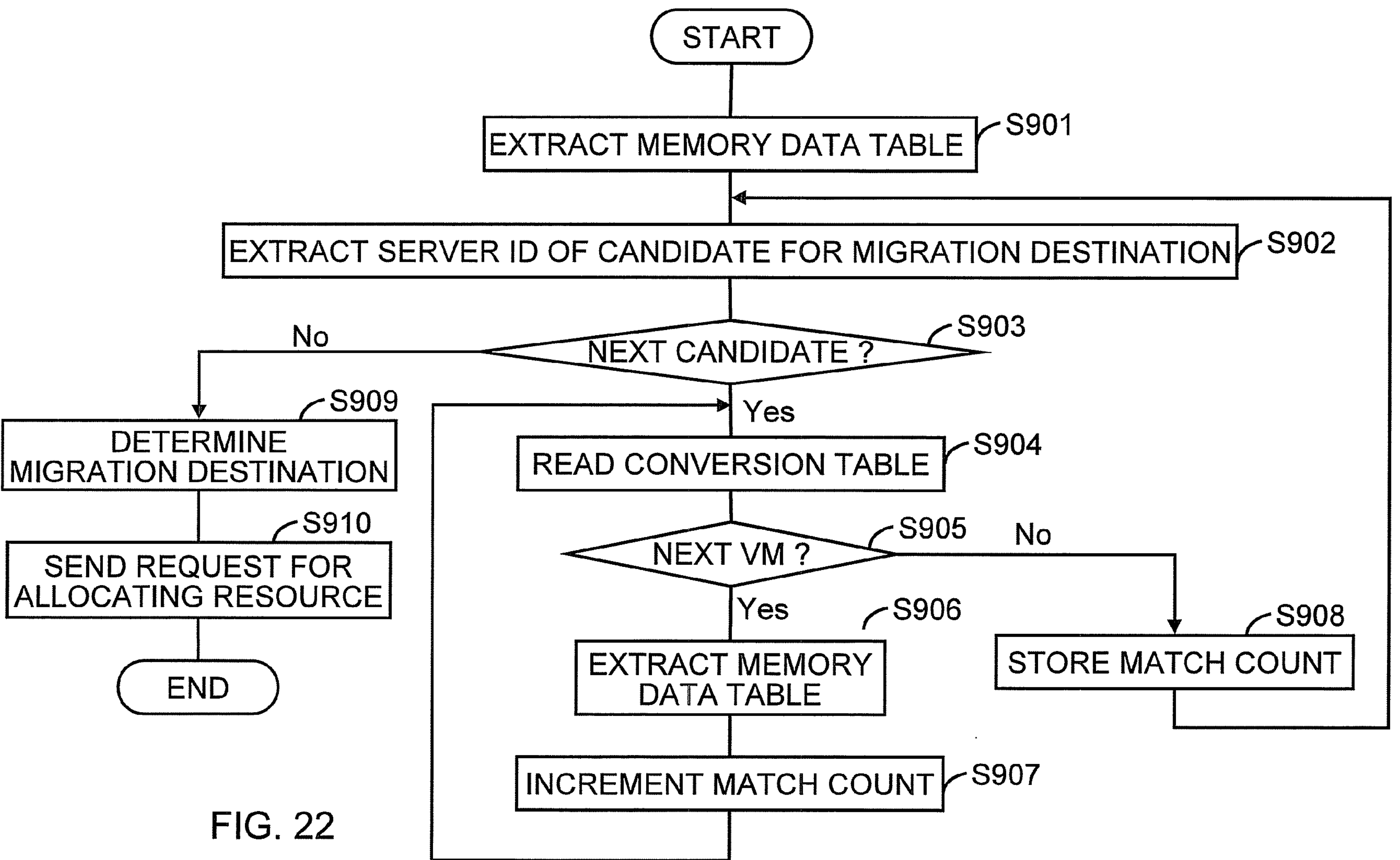
FIG. 22 is a flowchart illustrating a flow of a process for determining a migration destination performed by a resource migration system according to a fourth embodiment of the present invention.

FIG. 22 is a flowchart illustrating a flow of a process for determining a migration destination performed by a resource migration system according to a fourth embodiment of the present invention.

In Operation S901, for preparing the resource migration, the server 1 as the migration source transmits, to the server supervisor 3, a VM ID of a virtual machine whose resources are to be migrated. The CPU 30 of the server supervisor 3 extracts a memory data table T1 containing the received VM ID from the VM management DB 321.

In Operation S902, the CPU 30 extracts, one by one from server management tables T2, server IDs of candidate servers for a migration destination.

In Operation S903, the CPU 30 determines whether there is a next candidate server for a migration destination. When it is determined that there is no candidate server left for a migration destination ("No" in Operation S903), the process proceeds to Operation S909.

In Operation S904, when it is determined that there is a next candidate server for a migration destination ("Yes" in Operation S903), the CPU 30 extracts, one by one from the conversion tables T7 for the next candidate server, a memory ID 434 of the server.

In Operation S905, the CPU 30 determines whether there is a memory ID 434 for a next virtual machine. When it is determined that there is no memory ID 434 left to be processed ("No" in Operation S905), the process proceeds to Operation S908.

In Operation S906, when it is determined that there is a memory ID 434 for a next virtual machine ("Yes" in Operation S905), the CPU 30 extracts a memory data table T1 containing the memory ID 434 from the VM management DB 321, In Operation S907, the CPU 30 increments a match count for the candidate server by one if the server ID of the server 1 as the migration source and the memory ID 402 contained in the memory data table T1 extracted in Operation S901 is contained in the extracted conversion table T7 as the server ID 442 and the memory ID 444 corresponding to the memory ID 434 for the next virtual machine, and also if the memory data table T1 extracted in Operation S901 matches the memory data table T1 extracted in Operation S906. Herein, two memory data tables T1 may be assumed to match when the hash value 404 is the same between the two memory data tables T1, for example. The process returns to Operation S904 whereupon the CPU 30 repeats the process for the next virtual machine on the candidate server for a migration destination.

In Operation S908, when it is determined that the CPU 30 has performed the process for all the virtual machines on the candidate server for a migration destination and there is no virtual machine left to be processed ("No" in Operation S905), the CPU 30 stores the match count in the main memory 31. The CPU 30 returns the process to Operation S902 whereupon the CPU 30 repeats the process for the next candidate server for a migration destination.

In Operation S909, when it is determined that there is no candidate server for a migration destination ("No" in Operation S903), the CPU 30 determines a candidate server having the largest match count stored in the main memory 31 as the migration destination. The CPU 30 extracts a server ID of the determined server from the server management table T2.

In Operation S910, the CPU 30 transmits, to the determined server 2 as the migration destination identified by the extracted server ID, a request for allocating resources for running the virtual machines to be migrated.

Upon receiving the request for allocating resources transmitted from the server supervisor 3, the CPU 20 in the server 2 as the migration destination determines whether the resources for running the virtual machines to be migrated may be allocated. When it is determined that the resources for running the virtual machines may not be allocated, the CPU 20 transmits, to the server supervisor 3, a notice indicating that the resources for running the virtual machines to be migrated may not be allocated. When it is determined that the resources for running the virtual machines to be migrated may be allocated, the CPU 20 transmits, to the server supervisor 3, a notice indicating that the resources for running the virtual machines to be migrated are allocated.

In the resource migration system according to the fourth embodiment of the present invention, a server having the largest number of data segments D to be migrated is selected as the best migration destination. Thus, the resources in the server 1 as the migration source may be smoothly migrated to the selected server 2 as the migration destination and the data regarding management and usage of the main memory of the migration source may be quickly reconstructed on the migration destination.

Figure 23:
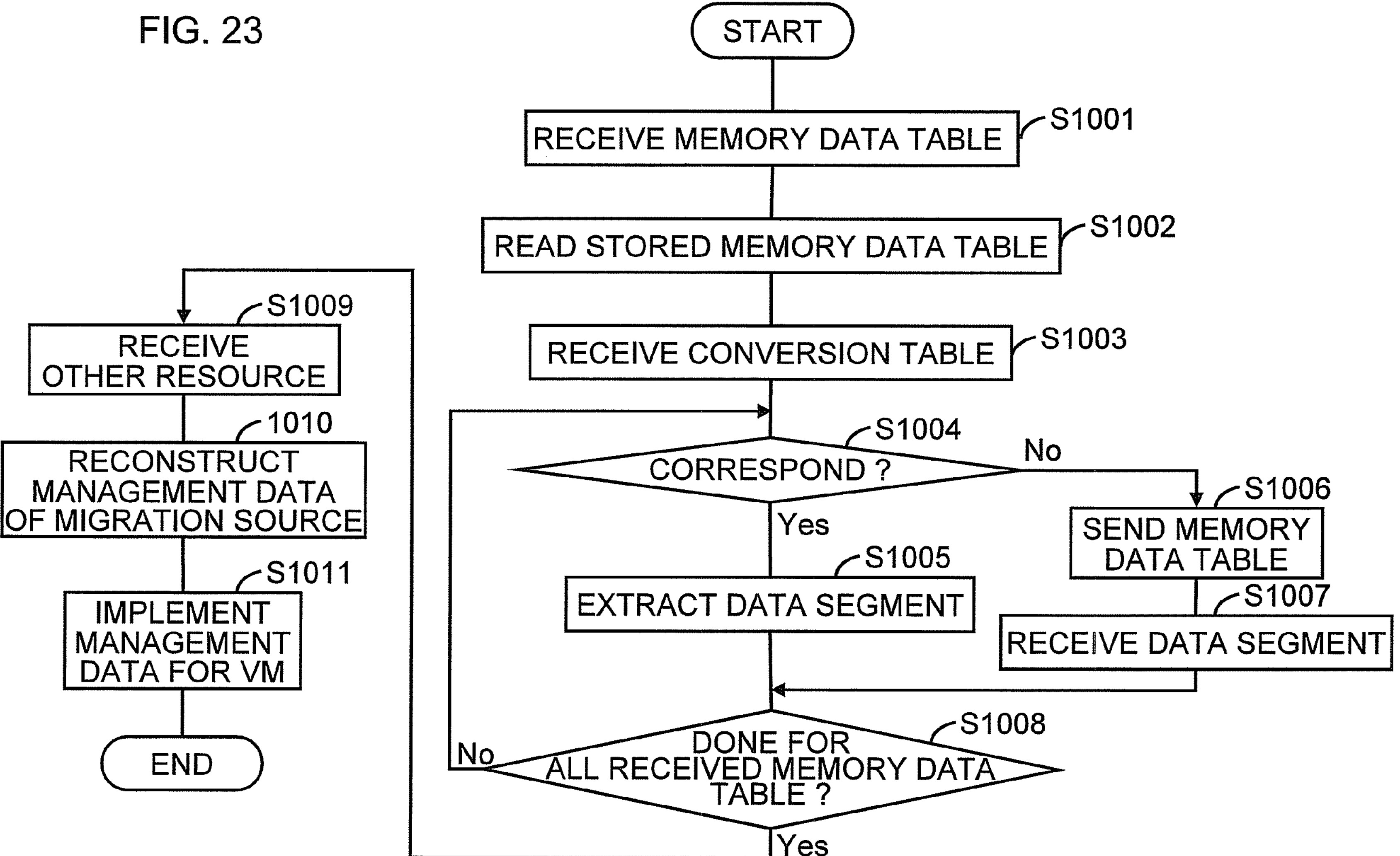
FIG. 23 is a flowchart illustrating a flow of a resource migration process performed by a resource migration system according to a fourth embodiment of the present invention.
Figure 24:
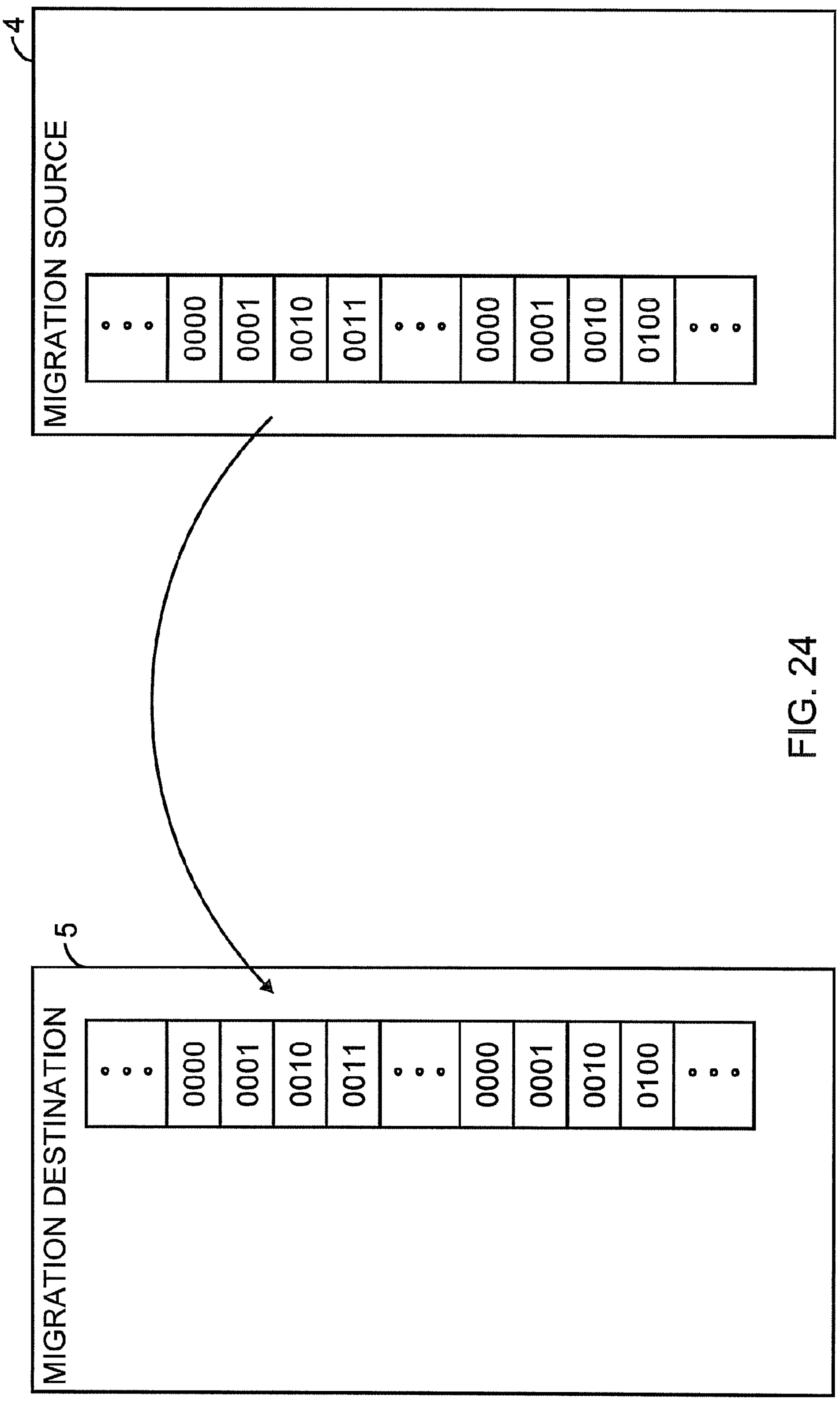
FIG. 24 is a diagram illustrating a conventional migration of resources.

FIG. 23 is a flowchart illustrating a flow of a resource migration process performed by a resource migration system according to a fourth embodiment of the present invention. The server supervisor 3 transmits, to the server 1 as the migration source, an instruction for resource migration. The instruction for resource migration includes a server ID of the server 2 as the migration destination determined through the process for determining the migration destination. The server 1 as the migration source transmits one or more memory data tables T1 to be migrated to the server 2 as the migration destination, in accordance with the instruction for resource migration received from the server supervisor 3.

In Operation S1001, the CPU 20 of the server 2 as the migration destination receives the one or more memory data tables T1 transmitted from the server 1 as the migration source.

In Operation S1002, the CPU 20 reads memory data tables T1 included in the memory data DB 220.

In Operation S1003, the CPU 20 receives the conversion table T7 for the server 2 from the server supervisor 3.

In Operation S1004, the CPU 20 determines, one by one for the received memory data tables T1, whether any of the memory data tables T1 for the server 2 corresponds to the received memory data table T1 by comparing the memory information 430 of the server with the memory information 440 of other servers contained in the received conversion table T7.

In Operation S1005, when it is determined that one of the memory data tables T1 for the server 2 corresponds to the received memory data table T1 ("Yes" in Operation S1004), the CPU 20 extracts a data segment D corresponding to the one of the memory data tables T1 for the server 2 from the data segment DB 221. Then, the process proceeds to Operation S1008.

In Operation S1006, when it is determined that none of the memory data tables T1 for the server 2 corresponds to the received memory data table T1 ("No" in Operation S1004), the CPU 20 transmits, to the server 1 as the migration source, the received memory data table T1 having no corresponding memory data table T1 for the server 2. Upon receiving the memory data table T1 having no corresponding memory data table T1 for the server 2, the CPU 10 of the server 1 as the migration source extracts a corresponding data segment D from the data segment DB 121. The CPU 10 transmits the extracted data segment D to the server 2 as the migration destination.

In Operation S1007, the CPU 20 in the server 2 as the migration destination receives the corresponding data segment D. Then, the process proceeds to Operation S1008.

In Operation S1008, upon extracting the data segment D corresponding to one of the memory data tables T1 for the server 2 (Operation S1005), or upon receiving the data segment D transmitted from the server 1 as the migration source (Operation S1007), the CPU 20 determines whether the process has been performed for all the memory data tables T1 received from the server 1 as the migration source. When it is determined that the process has not yet been performed for all the memory data tables T1 received from the server 1 ("No" in Operation S1008), the process returns to Operation S1004 whereupon the CPU 20 repeats the process for the next memory data table T1 received from the server 1 as the migration source.

In Operation S1009, when it is determined that the process has been performed for all the memory data tables T1 received from the server 1 ("Yes" in Operation S1008), the CPU 20 receives other resources transmitted from the server 1 as the migration source.

In Operation S1010, the CPU 20 reconstructs the data regarding management and usage of the main memory of the migration source.

In Operation S1011, the CPU 20 implements the reconstructed data regarding management and usage of the main memory for the virtual machine to be newly started. Then, the resource migration process ends.

The resource migration system according to the fourth embodiment of the present invention tries to reconstruct the data regarding management and usage of the main memory of the migration source with the data segments D stored in the migration destination, and migrates, from the migration source to the migration destination, only the data segments D that are not stored in the migration destination. Thus, the resource migration, may be performed more smoothly and quickly as compared with the case in which all the data segments D necessary for reconstructing the data regarding management and usage of the main memory are migrated from the migration source to the migration destination.

Fifth Embodiment

According to the examples of the first to fourth embodiments of the present invention, the server supervisor 3 performs the process for determining the migration destination when the server 1 as the migration source begins to prepare for resource migration at an arbitrary timing. The server supervisor 3, however, may perform the process for determining the migration destination when a virtual machine on the server 1 as the migration source wakes up from a suspending state. In a resource migration system according to a fifth embodiment of the present invention, a determined migration destination may reconstruct, to resume, the data regarding management and usage of the main memory of the migration source in the suspending state.

According to the examples of the second or third embodiment of the present invention, the server supervisor 3 determines memory information that is not managed by the server supervisor 3 on the basis of the update count or the priority. The server supervisor 3, however, may not manage memory contents assigned a predefined memory ID. In this case, the servers may separately list the memory IDs identifying the memory contents that are not managed by the server supervisor 3.

The server supervisor 3 may not manage memory contents stored in a predefined space of the main memory. In a conventional management technology for main memory, the main memory is divided into two spaces: a read-only space for storing the basic software and the application software; and a read/write space for storing the data. In this case, each server may update the omission flag for memory contents stored in the read/write space to "true".

Resource migration may be performed not only between the server 1 as the migration source and the server 2 as the migration destination, but also inside a server. When the CPU of the server consists of first and second cores and the spaces of the main memory for the cores are different, the resources may be migrated between the first core and the second core. In this case, the virtual machine on the server 1 as the migration source and the virtual machine on the server 2 as the migration destination may be replaced with a virtual machine on the first core and a virtual machine on the second core, respectively, in the first to fifth embodiments of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A resource migration system, comprising:

a plurality of servers communicably connected with each other, wherein a first server which is one of the plurality of servers includes:

a first main memory to store first memory data divided into a plurality of segments each having a predefined size, a first storage to store a set of first data segments, each of the first data segments being formed by copying each of the plurality of segments of the first memory data stored in the first main memory, and a first memory data manager to manage the first data segments stored in the first storage, wherein a second server which is another of the plurality of servers includes:

a second main memory to store second memory data divided into a plurality of segments each having the predefined size, a second storage to store a set of second data segments, each of the second data segments being formed by copying each of the plurality of segments of the second memory data stored in the second main memory, and a second memory data manager to manage the second data segments stored in the second storage, said second memory data manager:

receiving resource data regarding the first data segments from the first server determining whether each of the first data segments is able to be replaced by any of the second data segments, receiving from the first server a portion of the first data segments which are not replaceable by any of the second data segments, and reconstructing the first memory data by combining a portion of second data segments which replace first data segments that have been determined to be replaceable and the portion of the first data segments which are not replaceable by any of the second data segments, wherein the first memory data manager:

assigns first memory identifiers to the first data segments to identify each of the first data segments, consolidates the first data segments by reassigning the first memory identifiers so that first data segments having identical contents data are assigned with an identical first memory identifier, and transmits to the second server the first memory identifiers assigned to the first data segments to be migrated, and the second memory data manager:

assigns second memory identifiers to the second data segments to identify each of the second data segments, consolidates the second data segments by reassigning the second memory identifiers so that second data segments having identical contents data are assigned with an identical second memory identifier, receives the first memory identifiers transmitted from the first server, determines whether each of the first data segments is replaceable by any of the second data segments, by comparing received first memory identifiers with the second memory identifiers, and receives from the first server the portion of the first data segments which have been determined to be irreplaceable by any of the second data segments, in response to transmitting first memory identifiers of the some of the first data segments.

2. The resource migration system of claim 1, comprising:

a server supervisor to supervise the first memory data and the second memory data, said server supervisor being communicably connected with the plurality of servers, said server supervisor:

receiving the first data segments and the first memory identifiers from the first server, receiving the second data segments and the second memory identifiers from the second server, consolidating the first data segments and the second data segments by reassigning memory identifiers so that data segments having identical contents data are assigned with an identical memory identifier, and transmitting consolidated data segments and reassigned memory identifiers to the first server and the second server, wherein the first server:

transmits the first data segments and the first memory identifiers to the server supervisor, receives the consolidated data segments and the reassigned memory identifiers from the server supervisor, and consolidates the first data segments by reassigning the first memory identifiers in accordance with the consolidated data segments and the reassigned memory identifiers, and the second server:

transmits the second data segments and the second memory identifiers to the server supervisor, receives the consolidated data segments and the reassigned memory identifiers from the server supervisor, and consolidates the second data segments by reassigning the second memory identifiers in accordance with the consolidated data segments and the reassigned memory identifiers.

3. The resource migration system of claim 2, wherein said first memory data manager:

increments, each time the first memory data is updated, an update count indicating frequency of updating the first memory data, determines whether the update count exceeds a predefined threshold, and ceases, when it is determined that the update count exceeds the predefined threshold, transmission of the first data segments and the first memory identifiers to the server supervisor.

4. The resource migration system of claim 2, wherein said first memory data manager:

assigns a priority to the first memory data stored in the first main memory, determines whether the priority exceeds a predefined threshold, and ceases, when it is determined that the priority exceeds the predefined threshold, to transmit the first data segments and the first memory identifiers to the server supervisor.

5. The resource migration system of claim 2, wherein said server supervisor selects, as the second server, a candidate server storing a data segment having contents data identical to contents data of one of the first data segments, said candidate server being selected from among the plurality of servers.

6. The resource migration system of claim 1, comprising:

a server supervisor to supervise the first memory data and the second memory data, said server supervisor being communicably connected with the first server and the second server, said server supervisor:

receiving the first data segments and the first memory identifiers from the first server, receiving the second data segments and the second memory identifiers from the second server, generating a conversion table in which memory identifiers assigned to data segments having identical contents data are related each other, and transmitting a generated conversion table to the first server and the second server, wherein the first server:

transmits the first data segments and the first memory identifiers to the server supervisor, and receives the conversion table from the server supervisor, and the second server:

transmits the second data segments and the second memory identifiers to the server supervisor, and receives the conversion table from the server supervisor.

7. The resource migration system of claim 6, wherein said second memory data manager determines whether each of the first data segments is replaceable by any of the second data segments, by comparing received first memory identifiers with the second memory identifiers in accordance with the conversion table.

8. The resource migration system of claim 6, wherein said first memory data manager determines whether two data segments have identical contents data in accordance with the conversion table.

9. The resource migration system of claim 1, wherein said first memory data manager assigns, to new first data segments to be newly stored, new first memory identifiers different from the first memory identifiers assigned to the first data segments previously stored in the first storage.

10. The resource migration system of claim 1, wherein said first memory data manager transmits to the second server the resource data regarding the first data segments upon waking up from a suspending state.

11. The resource migration system of claim 1, wherein said first memory data manager transmits to the second server the first memory identifiers assigned to the first data segments to be migrated upon waking up from a suspending state.

12. A resource migration method executed by a resource migration system including a plurality of servers communicably connected with each other, said resource migration method comprising:

storing, by a first server which is one of the plurality of servers, in a first main memory first memory data divided into a plurality of segments each having a predefined size, the first memory data being generated as a result of executing any operation of the first server;

storing, by the first server, a set of first data segments in a first storage, each of the first data segments being formed by copying each of the plurality of segments of the first memory data stored in the first main memory;

transmitting, by the first server, resource data regarding the first data segments to a second server which is another of the plurality of servers;

storing, by the second server, in a second main memory second memory data divided into a plurality of segments each having the predefined size, the second memory data being generated as a result of executing any operation of the second server;

storing, by the second server, a set of second data segments in a second storage, each of the second data segments being formed by copying each of the plurality of segments of the second memory data stored in the second main memory;

receiving, by the second server, the resource data regarding the first data segments from the first server;

determining, by the second server, whether each of the first data segments is replaceable by any of the second data segments;

receiving, by the second server, from the first server a portion of the first data segments which are not replaceable by any of the second data segments;

reconstructing the first memory data by combining a portion of second data segments which replace first data segments that have been determined to be replaceable and the portion of the first data segments which are not replaceable by any of the second data segments;

assigning, by the first server, first memory identifiers to the first data segments to identify each of the first data segments;

consolidating, by the first server, the first data segments by reassigning the first memory identifiers so that first data segments having identical contents data are assigned with an identical first memory identifier;

transmitting, by the first server, to the second server the first memory identifiers assigned to the first data segments to be migrated;

assigning, by the second server, second memory identifiers to the second data segments to identify each of the second data segments;

consolidating, by the second server, the second data segments by reassigning the second memory identifiers so that second data segments having identical contents data are assigned with an identical second memory identifier;

receiving, by the second server, the first memory identifiers transmitted from the first server;

determining, by the second server, whether each of the first data segments is replaceable by any of the second data segments, by comparing received first memory identifiers with the second memory identifiers; and receiving, by the second server, from the first server a portion of the first data segments which have been determined to be irreplaceable by any of the second data segments, in response to transmitting first memory identifiers of the some of the first data segments.

13. The resource migration method of claim 12, said resource migration system including a server supervisor to supervise the first memory data and the second memory data, said server supervisor being communicably connected with the plurality of servers, said resource migration method comprising:

receiving, by the server supervisor, the first data segments and the first memory identifiers from the first server;

receiving, by the server supervisor, the second data segments and the second memory identifiers from the second server;

consolidating, by the server supervisor, the first data segments and the second data segments by reassigning the memory identifiers so that data segments having identical contents data are assigned with an identical memory identifier;

transmitting, by the server supervisor, consolidated data segments and reassigned memory identifiers to the first server and the second server;

transmitting, by the first server, the first data segments and the first memory identifiers to the server supervisor;

receiving, by the first server, the consolidated data segments and the reassigned memory identifiers from the server supervisor;

consolidating, by the first server, the first data segments by reassigning the first memory identifiers in accordance with the consolidated data segments and the reassigned memory identifiers;

transmitting, by the second server, the second data segments and the second memory identifiers to the server supervisor;

receiving, by the second server, the consolidated data segments and the reassigned memory identifiers from the server supervisor; and consolidating, by the second server, the second data segments by reassigning the second memory identifiers in accordance with the consolidated data segments and the reassigned memory identifiers.

14. The resource migration method of claim 12, said resource migration system including a server supervisor to supervise the first memory data and the second memory data, said server supervisor being communicably connected with the plurality of servers, said resource migration method comprising:

receiving, by the server supervisor, the first data segments and the first memory identifiers from the first server;

receiving, by the server supervisor, the second data segments and the second memory identifiers from the second server;

generating, by the server supervisor, a conversion table in which memory identifiers assigned to data segments having identical contents data are related each other;

transmitting, by the server supervisor, a generated conversion table to the first server and the second server;

transmitting, by the first server, the first data segments and the first memory identifiers to the server supervisor;

receiving, by the first server, the conversion table from the server supervisor;

transmitting, by the second server, the second data segments and the second memory identifiers to the server supervisor; and receiving, by the second server, the conversion table from the server supervisor.

15. The resource migration method of claim 14, comprising:

determining, by the second server, whether each of the first data segments is replaceable by any of the second data segments, by comparing received first memory identifiers with the second memory identifiers in accordance with the conversion table.

16. The resource migration method of claim 14, comprising:

determining, by the first server, whether two data segments have identical contents data in accordance with the conversion table.

17. The resource migration method of claim 12, comprising:

transmitting, by the first server, to the second server the resource data regarding the first data segments upon waking up from a suspending state.

18. A non-transitory computer-readable medium encoded with computer-executable instructions enabling a computer to execute a resource migration method, said computer being communicably connected with a plurality of servers, said resource migration method comprising:

storing, by a first server which is one of the plurality of servers, in a first main memory first memory data divided into a plurality of segments each having a predefined size, the first memory data being generated as a result of executing any operation of the first server;

storing, by the first server, a set of first data segments in a first storage, each of the first data segments being formed by copying each of the plurality of segments of the first memory data stored in the first main memory;

transmitting, by the first server, resource data regarding the first data segments to a second server which is another of the plurality of servers;

storing, by the second server, in a second main memory second memory data divided into a plurality of segments each having the predefined size, the second memory data being generated as a result of executing any operation of the second server;

storing, by the second server, a set of second data segments in a second storage, each of the second data segments being formed by copying each of the plurality of segments of the second memory data stored in the second main memory;

receiving, by the second server, the resource data regarding the first data segments from the first server;

determining, by the second server, whether each of the first data segments is replaceable by any of the second data segments;

receiving, by the second server, from the first server a portion of the first data segments which are not replaceable by any of the second data segments;

reconstructing the first memory data by combining a portion of second data segments which replace first data segments that have been determined to be replaceable and the portion of the first data segments which are not replaceable by any of the second data segments;

assigning, by the first server, first memory identifiers to the first data segments to identify each of the first data segments;

consolidating, by the first server, the first data segments by reassigning the first memory identifiers so that first data segments having identical contents data are assigned with an identical first memory identifier;

transmitting, by the first server, to the second server the first memory identifiers assigned to the first data segments to be migrated;

assigning, by the second server, second memory identifiers to the second data segments to identify each of the second data segments;

consolidating, by the second server, the second data segments by reassigning the second memory identifiers so that second data segments having identical contents data are assigned with an identical second memory identifier;

receiving, by the second server, the first memory identifiers transmitted from the first server;

determining, by the second server, whether each of the first data segments is replaceable by any of the second data segments, by comparing received first memory identifiers with the second memory identifiers; and receiving, by the second server, from the first server a portion of the first data segments which have been determined to be irreplaceable by any of the second data segments, in response to transmitting first memory identifiers of the some of the first data segments.

* * * * *